US007006927B2

(12) United States Patent
Yakhini et al.

(10) Patent No.: US 7,006,927 B2
(45) Date of Patent: Feb. 28, 2006

(54) METHOD AND SYSTEM FOR EXTRACTING DATA FROM SURFACE ARRAY DEPOSITED FEATURES

(75) Inventors: Zohar Yakhini, Zikhron Ya'acov (IL); Cynthia Y. Enderwick, San Jose, CA (US); Glenda C. Delenstarr, Belmont, CA (US); Paul K. Wolber, Los Altos, CA (US); Nicholas M. Sampas, San Jose, CA (US); Herbert F. Cattell, Mountain View, CA (US); Scott D. Connell, Saratoga, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 610 days.

(21) Appl. No.: 10/086,839

(22) Filed: Feb. 28, 2002

(65) Prior Publication Data

US 2002/0193962 A1    Dec. 19, 2002

Related U.S. Application Data

(63) Continuation-in-part of application No. 09/589,046, filed on Jun. 6, 2000, now Pat. No. 6,591,196.

(51) Int. Cl.
 *G06F 11/32* (2006.01)
(52) U.S. Cl. .............................. 702/28; 435/4; 356/317
(58) Field of Classification Search ................. 702/28, 702/19–27, 128; 435/4, 30, 34, 39, 183, 435/287.1, 288.6, 288.7, 283.1, 283.2; 356/300, 356/302, 303, 308, 317–319, 451, 244, 246
See application file for complete search history.

(56) References Cited

U.S. PATENT DOCUMENTS

2003/0087289 A1 *  5/2003  Zuzan et al. ................... 435/6

FOREIGN PATENT DOCUMENTS

| WO | WO 99/08233 | 2/1999 |
| WO | WO 01/06395 | 1/2001 |

OTHER PUBLICATIONS

R.C.Y. Cheung, Christopher J.S. deSilva, "Anamlysis of Gene Microarray Images", 1999IEEE, pp. 627-632.
A. Kuklin, S. Shams & S. Shah, "High throughput screeining of gene expression signatures", Genetica 108: 2000, pp. 41-46.

* cited by examiner

*Primary Examiner*—Edward Raymond

(57) ABSTRACT

A method and system for extracting data signals from a scanned image resulting from optical, radiometric, or other types of analysis of a molecular array. The positions of corner features are first located. Then, an initial feature coordinate grid is determined from the positions of the corner features. A refined feature coordinate grid is then calculated based on the positions of strong features, and is used to identify the positions of weak features and the positions of the local background regions surrounding all features. Finally, signal intensity values are extracted from the features and their respective local background regions in the scanned image, and background-subtracted signal intensity values, background-subtracted and normalized signal intensity ratios, and variability information and confidence intervals are determined based on the extracted values.

12 Claims, 34 Drawing Sheets

101

| 602 | 604 |
|---|---|
| 0 | 0 |
| 1 | 0 |
| 2 | 5 |
| 3 | 9 |
| 4 | 2 |
| 5 | 13 |
| 6 | 36 |
| 7 | 50 |
| 8 | 79 |
| 9 | 91 |
| 10 | 121 |
| 11 | 121 |
| 12 | 152 |
| 13 | 144 |
| 14 (606) | 169 (608) |
| 15 | 170 |
| 16 | 162 |
| 17 | 169 |
| 18 | 180 |
| 19 | 170 |
| 20 | 160 |
| 21 | 146 |
| 22 | 141 |
| 23 | 121 |
| 24 | 115 |
| 25 | 100 |
| 26 | 63 |
| 27 | 57 |
| 28 | 28 |
| 29 | 7 |
| 30 | 0 |
| 31 | 3 |
| 32 | 3 |
| 33 | 2 |
| 34 | 0 |
| 35 | 0 |

*Fig. 6A*

| 612 | 610 |
|---|---|
| 0 | 0 |
| 1 | 1.25 |
| 2 | 4.75 |
| 3 | 6.25 |
| 4 | 6.5 |
| 5 | 16 |
| 6 | 33.75 |
| 7 | 59.75 |
| 8 | 74.75 |
| 9 | 95.5 |
| 10 | 113.5 |
| 11 | 128.75 |
| 12 | 142.25 |
| 13 | 163 |
| 14 | 163 |
| 15 | 167.75 |
| 16 | 165.75 |
| 17 | 170 |
| 18 | 174.75 |
| 19 | 170 |
| 20 | 159 |
| 21 | 148.25 |
| 22 | 137.25 |
| 23 | 124.5 |
| 24 | 112.75 |
| 25 | 94.5 |
| 26 | 70.75 |
| 27 | 51.25 |
| 28 | 30 |
| 29 | 10.5 |
| 30 | 2.5 |
| 31 | 2.25 |
| 32 | 2.75 |
| 33 | 1.75 |
| 34 | .5 |
| 35 | 0 |

*Fig. 6B*

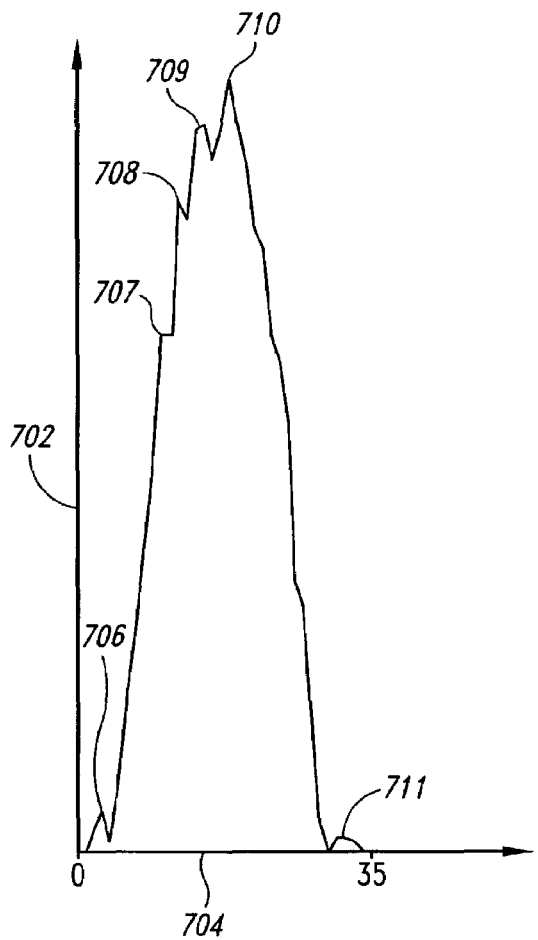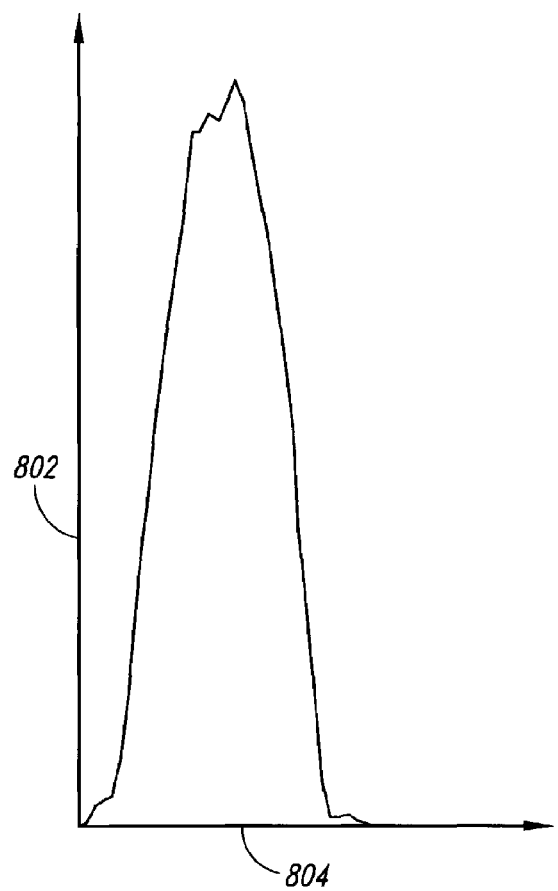
*Fig. 7*  *Fig. 8*
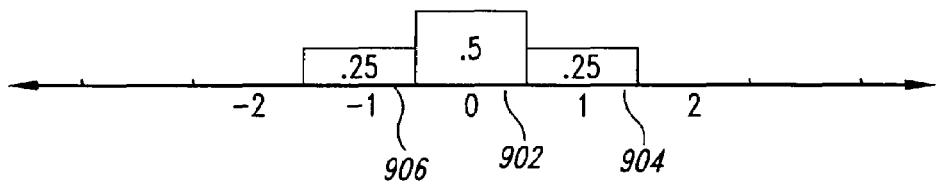
*Fig. 9*

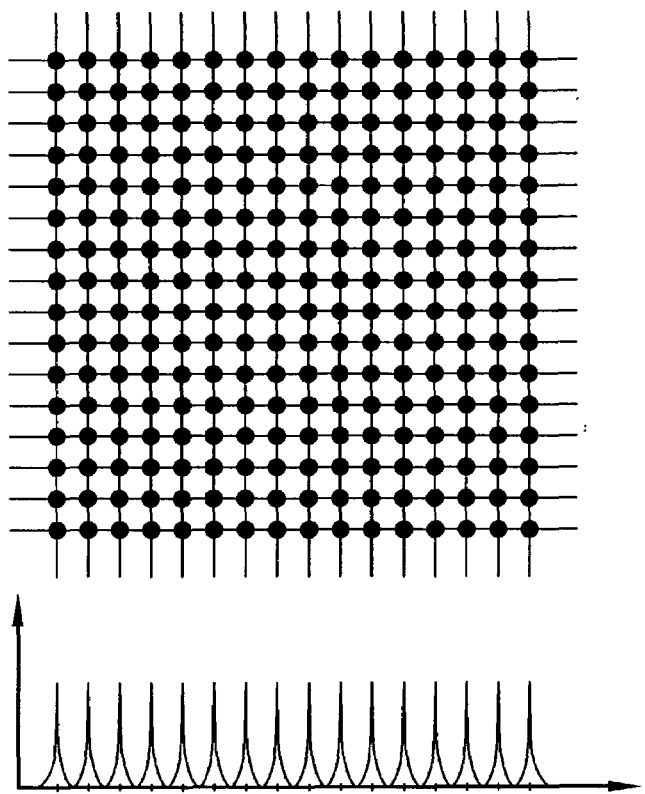
*Fig. 10A*
*Fig. 10B*
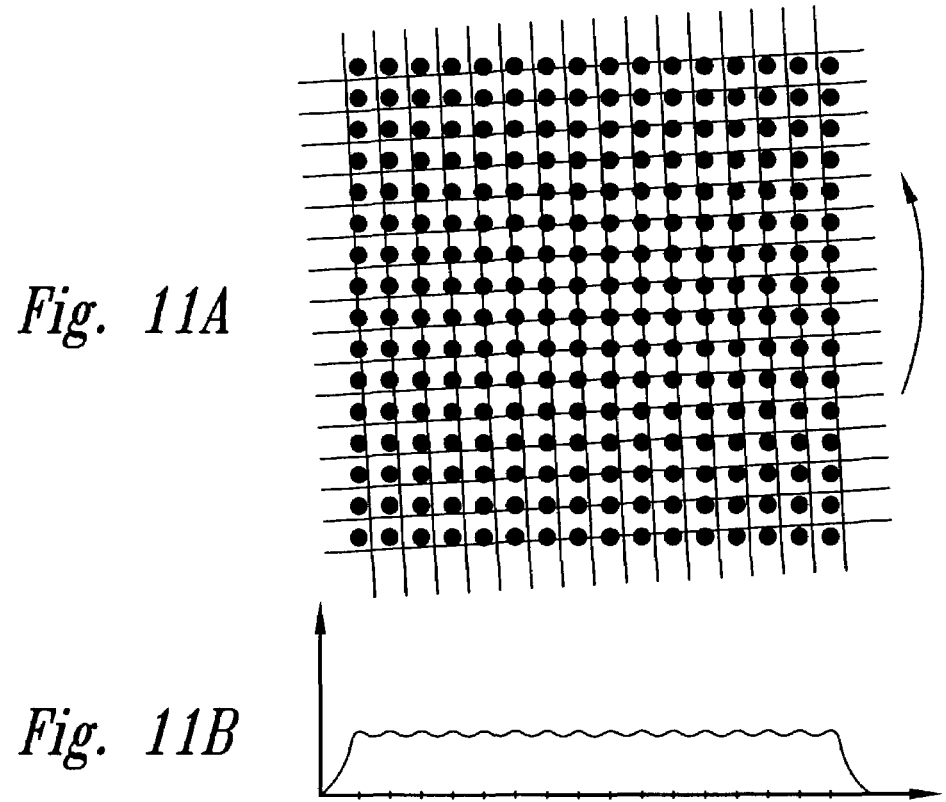
*Fig. 11A*
*Fig. 11B*

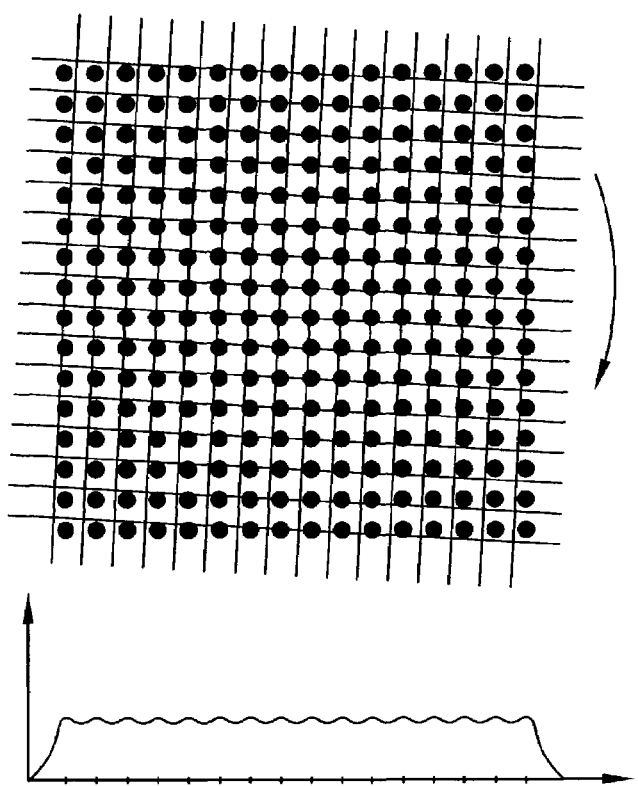
Fig. 12A
Fig. 12B
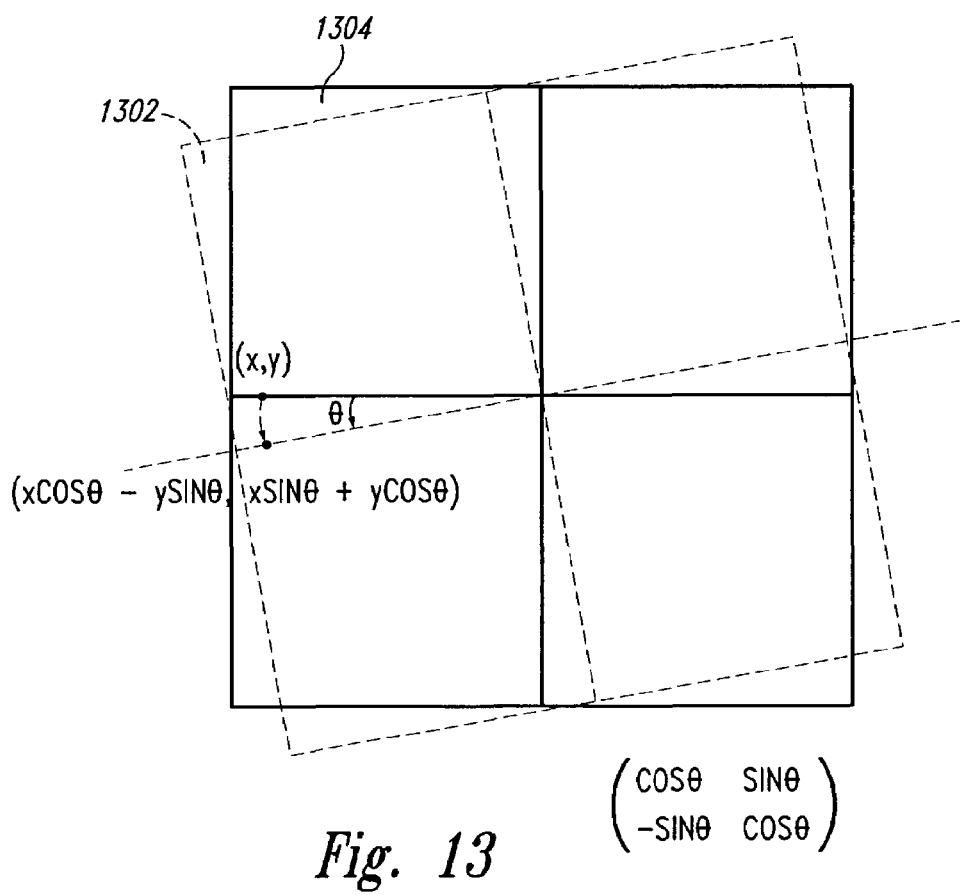
Fig. 13

*Fig. 23A*

$$\begin{bmatrix} 0 & 7 & 11 & 3 & 4 & 5 & 9 & 3 & 5 & 9 & 3 & 4 & 5 & 6 & 7 & 9 & 0 & 9 & 11 & 3 & 4 & 5 & 6 & 7 & 9 & 5 & 9 & 5 & 9 & 0 & 3 & 4 & 5 & 6 & 7 & 9 & 11 \\ 0 & 0 & 0 & 1 & 1 & 1 & 1 & 2 & 2 & 2 & 3 & 3 & 3 & 3 & 3 & 3 & 4 & 4 & 4 & 5 & 5 & 5 & 5 & 5 & 5 & 6 & 6 & 7 & 7 & 8 & 8 & 8 & 8 & 8 & 8 & 8 & 8 \\ 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 \end{bmatrix}$$

*Fig. 23B*

$$\begin{bmatrix}
-0.017451 & -0.016036 & 0.198716 \\
0.004029 & -0.016920 & 0.076562 \\
0.016303 & -0.017425 & 0.006760 \\
-0.008371 & -0.012535 & 0.130329 \\
-0.005303 & -0.012661 & 0.112878 \\
-0.002234 & -0.012788 & 0.095428 \\
0.010040 & -0.013293 & 0.025625 \\
-0.008497 & -0.008656 & 0.114293 \\
-0.002360 & -0.008908 & 0.079392 \\
0.009914 & -0.009413 & 0.009590 \\
-0.008624 & -0.004776 & 0.098257 \\
-0.005555 & -0.004902 & 0.080807 \\
-0.002487 & -0.005029 & 0.063356 \\
0.000582 & -0.005155 & 0.045905 \\
0.003650 & -0.005281 & 0.028455 \\
0.009788 & -0.005534 & -0.006446 \\
-0.017956 & -0.000518 & 0.134573 \\
0.009661 & -0.001654 & -0.022482 \\
0.015798 & -0.001907 & -0.057383 \\
-0.008876 & 0.002983 & 0.066185 \\
-0.005808 & 0.002857 & 0.048735 \\
-0.002739 & 0.002731 & 0.031284 \\
0.000329 & 0.002604 & 0.013834 \\
0.003398 & 0.002478 & -0.003617 \\
0.009535 & 0.002225 & -0.038518 \\
-0.002865 & 0.006610 & 0.015249 \\
0.009409 & 0.006105 & -0.054554 \\
-0.002992 & 0.010490 & -0.000787 \\
0.009282 & 0.009985 & -0.070589 \\
-0.018461 & 0.015001 & 0.070430 \\
-0.009255 & 0.014622 & 0.018078 \\
-0.006187 & 0.014495 & 0.000628 \\
-0.003118 & 0.014369 & -0.016823 \\
-0.000049 & 0.014243 & -0.034274 \\
0.003019 & 0.014117 & -0.051724 \\
0.009156 & 0.013864 & -0.086625 \\
0.015293 & 0.013611 & -0.121526
\end{bmatrix}$$

*Fig. 24*

$$\begin{bmatrix}
86.089577 & 26.017683 \\
383.000000 & 31.000000 \\
551.291059 & 26.359085 \\
212.931324 & 68.929091 \\
255.231273 & 69.194722 \\
297.287336 & 69.211879 \\
466.739268 & 68.997430 \\
212.698809 & 111.308354 \\
297.171645 & 111.213493 \\
466.523521 & 111.238239 \\
212.651844 & 153.379944 \\
254.917398 & 153.737417 \\
297.073053 & 153.872811 \\
339.361872 & 154.102630 \\
381.928982 & 154.162067 \\
466.615409 & 153.735791 \\
85.775819 & 195.305283 \\
466.525669 & 195.796267 \\
551.399497 & 195.886935 \\
212.009756 & 238.402912 \\
254.664292 & 238.423417 \\
296.787962 & 238.298611 \\
339.073554 & 238.397928 \\
381.649538 & 238.367180 \\
466.396305 & 238.098358 \\
296.617866 & 281.180204 \\
466.413707 & 280.707080 \\
296.652245 & 323.094132 \\
466.344320 & 322.877040 \\
85.168403 & 364.952355 \\
212.153659 & 365.236585 \\
254.556017 & 365.400005 \\
296.752238 & 365.379902 \\
339.075490 & 365.433413 \\
381.556377 & 365.535990 \\
466.149127 & 365.083226 \\
551.117647 & 365.164216
\end{bmatrix}$$

Fig. 25

$$\begin{bmatrix}
42.336575 & 0.032847 \\
-0.101626 & 42.265883 \\
85.880412 & 26.859797
\end{bmatrix}$$

Fig. 26

$$\begin{matrix}
2702 & 85.880412 & 26.859797 \\
& 128.216987 & 26.892644 \\
& 170.553562 & 26.925492 \\
2704 & 212.890137 & 26.958339 \\
& 255.226712 & 26.991186 \\
& 297.563288 & 27.024034 \\
& 339.899863 & 27.056881 \\
& 382.236438 & 27.089729 \\
& 424.573013 & 27.122576 \\
& 466.909588 & 27.155423 \\
& 509.246163 & 27.188271 \\
& 551.582738 & 27.221118 \\
2706 & 85.778786 & 69.125680 \\
& 128.115361 & 69.158527 \\
& 170.451936 & 69.191375 \\
& 212.788511 & 69.224222 \\
& 255.125086 & 69.257070 \\
& 297.461661 & 69.289917 \\
& 339.798236 & 69.322764 \\
& 382.134812 & 69.355612 \\
& 424.471387 & 69.388459 \\
& 466.807962 & 69.421306 \\
& 509.144537 & 69.454154 \\
& 551.481112 & 69.487001 \\
& 85.677160 & 111.391563 \\
& 128.013735 & 111.424411 \\
& 170.350310 & 111.457258 \\
& 212.686885 & 111.490105 \\
& 255.023460 & 111.522953 \\
& 297.360035 & 111.555800 \\
& 339.696610 & 111.588648 \\
& 382.033185 & 111.621495 \\
& 424.369760 & 111.654342 \\
& 466.706336 & 111.687190 \\
& 509.042911 & 111.720037 \\
& 551.379486 & 111.752884 \\
& 85.575534 & 153.657446 \\
& 127.912109 & 153.690294 \\
& 170.248684 & 153.723141 \\
& 212.585259 & 153.755989 \\
& 254.921834 & 153.788836 \\
& 297.258409 & 153.821683 \\
& 339.594984 & 153.854531 \\
& 381.931559 & 153.887378 \\
& 424.268134 & 153.920225 \\
& 466.604709 & 153.953073 \\
& 508.941284 & 153.985920 \\
& 551.277860 & 154.018768 \\
& 85.473908 & 195.923330 \\
& 127.810483 & 195.956177 \\
& 170.147058 & 195.989024 \\
& 212.483633 & 196.021872 \\
\end{matrix}$$

*Fig. 27A*

$$\begin{bmatrix}
254.820208 & 196.054719 \\
297.156783 & 196.087566 \\
339.493358 & 196.120414 \\
381.829933 & 196.153261 \\
424.166508 & 196.186109 \\
466.503083 & 196.218956 \\
508.839658 & 196.251803 \\
551.176233 & 196.284651 \\
85.372282 & 238.189213 \\
127.708857 & 238.222060 \\
170.045432 & 238.254907 \\
212.382007 & 238.287755 \\
254.718582 & 238.320602 \\
297.055157 & 238.353450 \\
339.391732 & 238.386297 \\
381.728307 & 238.419144 \\
424.064882 & 238.451992 \\
466.401457 & 238.484839 \\
508.738032 & 238.517687 \\
551.074607 & 238.550534 \\
85.270655 & 280.455096 \\
127.607230 & 280.487943 \\
169.943806 & 280.520791 \\
212.280381 & 280.553638 \\
254.616956 & 280.586485 \\
296.953531 & 280.619333 \\
339.290106 & 280.652180 \\
381.626681 & 280.685028 \\
423.963256 & 280.717875 \\
466.299831 & 280.750722 \\
508.636406 & 280.783570 \\
550.972981 & 280.816417 \\
85.169029 & 322.720979 \\
127.505604 & 322.753826 \\
169.842179 & 322.786674 \\
212.178754 & 322.819521 \\
254.515330 & 322.852369 \\
296.851905 & 322.885216 \\
339.188480 & 322.918063 \\
381.525055 & 322.950911 \\
423.861630 & 322.983758 \\
466.198205 & 323.016606 \\
508.534780 & 323.049453 \\
550.871355 & 323.082300 \\
85.067403 & 364.986862 \\
127.403978 & 365.019710 \\
169.740553 & 365.052557 \\
212.077128 & 365.085404 \\
254.413703 & 365.118252 \\
296.750278 & 365.151099 \\
339.086854 & 365.183947 \\
381.423429 & 365.216794 \\
423.760004 & 365.249641 \\
466.096579 & 365.282489 \\
508.433154 & 365.315336 \\
550.769729 & 365.348184
\end{bmatrix}$$

*Fig. 27B*

RED
1796

*Fig. 30*

METHOD AND SYSTEM FOR EXTRACTING DATA FROM SURFACE ARRAY DEPOSITED FEATURES

CROSS-REFERENCE TO RELATED APPLICATIONS

This application is a continuation-in-part of U.S. patent application Ser. No. 09/589,046 "Method And System For Extracting Data From Surface Array Deposited Features", filed Jun. 6, 2000 now U.S. Pat. No. 6,591,196 by Enderwick, et al., from which priority is claimed and which is incorporated herein by reference.

TECHNICAL FIELD

The present invention relates to the analysis of molecular arrays, or biochips, and, in particular, to a method and system for processing a scanned image of a molecular array in order to index the regions of the image that correspond to features of the molecular array and to extract data from indexed positions within the scanned image that correspond to optical or radiometric signals emanating from features of the molecular array.

BACKGROUND OF THE INVENTION

Molecular arrays are widely used and increasingly important tools for rapid hybridization analysis of sample solutions against hundreds or thousands of precisely ordered and positioned features containing different types of molecules within the molecular arrays. Molecular arrays are normally prepared by synthesizing or attaching a large number of molecular species to a chemically prepared substrate such as silicone, glass, or plastic. Each feature, or element, within the molecular array is defined to be a small, regularly shaped region on the surface of the substrate. The features are arranged in a regular pattern. Each feature within the molecular array may contain a different molecular species, and the molecular species within a given feature may differ from the molecular species within the remaining features of the molecular array. In one type of hybridization experiment, a sample solution containing radioactively, fluorescently, or chemiluminescently labeled molecules is applied to the surface of the molecular array. Certain of the labeled molecules in the sample solution may specifically bind to, or hybridize with, one or more of the different molecular species that together comprise the molecular array. Following hybridization, the sample solution is removed by washing the surface of the molecular array with a buffer solution, and the molecular array is then analyzed by radiometric or optical methods to determine to which specific features of the molecular array the labeled molecules are bound. Thus, in a single experiment, a solution of labeled molecules can be screened for binding to hundreds or thousands of different molecular species that together comprise the molecular array. Molecular arrays commonly contain oligonucleotides or complementary deoxyribonucleic acid ("cDNA") molecules to which labeled deoxyribonucleic acid ("DNA") and ribonucleic acid ("RNA") molecules bind via sequence-specific hybridization.

Generally, radiometric or optical analysis of the molecular array produces a scanned image consisting of a two-dimensional matrix, or grid, of pixels, each pixel having one or more intensity values corresponding to one or more signals. Scanned images are commonly produced electronically by optical or radiometric scanners and the resulting two-dimensional matrix of pixels is stored in computer memory or on a non-volatile storage device. Alternatively, analog methods of analysis, such as photography, can be used to produce continuous images of a molecular array that can be then digitized by a scanning device and stored in computer memory or in a computer storage device.

FIG. 1 shows a generalized representation of a molecular array. Disk-shaped features of the molecular array, such as feature 101, are arranged on the surface of the molecular array in rows and columns that together comprise a two-dimensional matrix, or grid. Features in alternative types of molecular arrays may be arranged to cover the surface of the molecular array at higher densities, as, for example, by offsetting the features in adjacent rows to produce a more closely packed arrangement of features. Radiometric or optical analysis of a molecular array, following a hybridization experiment, results in a two-dimensional matrix, or grid, of pixels. FIG. 2 illustrates the two-dimension grid of pixels in a square area of a scanned image-encompassing feature 101 of FIG. 1. In FIG. 2, pixels have intensity values ranging from 0 to 9. Intensity values of all non-zero pixels are shown in FIG. 2 as single digits within the pixel. The non-zero pixels of this scanned-image-representing feature 101 of FIG. 1 inhabit a roughly disk-shaped region corresponding to the shape of the feature. The pixels in a region surrounding a feature generally have low or 0 intensity values due to an absence of bound signal-producing radioactive, fluorescent, or chemiluminescent label molecules. However, background signals, such as the background signal represented by non-zero pixel 202, may arise from non-specific binding of labeled molecules due to imprecision in preparation of molecular arrays and/or imprecision in the hybridization and washing of molecular arrays, and may also arise from imprecision in optical or radiometric scanning and various other sources of error that may depend on the type of analysis used to produce the scanned image. Additional background signal may be attributed to contaminants in the surface of the molecular array or in the sample solutions to which the molecular array is exposed. In addition, pixels within the disk-shaped image of a feature, such as pixel 204, may have 0 values or may have intensity values outside the range of expected intensity values for a feature. Thus, scanned images of molecular array features may often show noise and variation and may depart significantly from the idealized scanned image shown in FIG. 1.

FIG. 3 illustrates indexing of a scanned image produced from a molecular array. A set of imaginary horizontal and vertical grid lines, such as horizontal grid line 301, are arranged so that the intersections of vertical and horizontal grid lines correspond with the centers of features. The imaginary grid lines establish a two-dimensional index grid for indexing the features. Thus, for example, feature 302 can be specified by the indices (0,0). For alternative arrangements of features, such as the more closely packed arrangements mentioned above, a slightly more complicated indexing system may be used. For example, feature locations in odd-indexed rows having a particular column index may be understood to be physically offset horizontally from feature locations having the same column index in even-indexed rows. Such horizontal offsets occur, for example, in hexagonal, closest-packed arrays of features.

In order to interpret the scanned image resulting from optical or radiometric analysis of a molecular array, the scanned image needs to be processed to: (1) index the positions of features within the scanned image; (2) extract data from the features and determine the magnitudes of background signals; (3) compute, for each signal, background subtracted magnitudes for each feature; (4) normalize signals produced from different types of analysis, as, for example, dye normalization of optical scans conducted at different light wavelengths to normalize different response curves produced by chromophores at different wavelengths; and (5) determine the ratios of background-subtracted and normalized signals for each feature while also determining a statistical measure of the variability of the ratios or confidence intervals related to the distribution of the signal ratios about a mean signal ratio value. These various steps in the processing of scanned images produced as a result of optical or radiometric analysis of molecular arrays together comprise an overall process called feature extraction.

Designers, manufacturers, and users of molecular arrays have recognized a need for automated feature extraction. Automated feature extraction, like any other automated technique, can produce enormous savings in the time and cost of using molecular arrays for chemical and biological analysis. Automated feature extraction can also eliminate inconsistencies caused by user error and can greatly increase the reproducibility and objectivity of feature extraction.

SUMMARY OF THE INVENTION

One embodiment of the present invention comprises a method and system for automated feature extraction from scanned images produced by optical, radiometric, or other types of analysis of molecular arrays. First, horizontal and vertical projections of pixel values, called row and column vectors, are computationally produced from the scanned image. The row and column vectors are analyzed to determine the positions of peaks, and the positions of the first and last peaks in the row and column vectors are used to estimate the positions of the corner features within the scanned image. Typically, bright control features, i.e. features designed to hybridize to labeled sample molecules of any sample solution to which a molecular array is exposed, are placed on the border of the molecular array to facilitate this process. When necessary, row and column vectors can be calculated over a range of rotations of a two-dimensional, orthogonal coordinate system in order to select the most favorable rotation angle at which to fix the coordinate system. Analysis of regions of the scanned image representing the corner features can be used to more exactly locate the positions of the corner features. Then, using the established positions of the corner features, an initial coordinate system is computationally established for the scanned image. Using the initial coordinate system, the centroids of features producing strong signals, or, in other words, pixels having high signal-to-noise ratios and located close to expected positions in the scanned image, are determined, and a regression analysis is used to refine the coordinate system to best correspond to the determined positions of the strong features. The refined coordinate system is employed to locate the positions of weak features and the positions of the background regions local to each feature. Next, a process is used to analyze various different signals generated by different analytical methods in order to select the most reliable portions of each feature and the local background surrounding the feature for subsequent signal extraction and signal variability determinations. For example, the fluorescence of hybridized labeled molecules may be measured at green light wavelengths and at red light wavelengths, with the intensities produced at each position of the surface of the molecular array at red and green wavelengths corresponding to two different signals. Finally, signal data and variability of signal data are extracted from the reliable regions of each feature and each local background region of the scanned image.

BRIEF DESCRIPTION OF THE DRAWINGS

FIG. 6A shows the initial column vector computed from a pixel grid.

FIG. 6B shows the column vector of FIG. 6A following smoothing.

FIG. 7 graphically illustrates the initial column vector of FIG. 6A.

FIG. 8 graphically illustrates the smoothed column vector of FIG. 6B.

FIG. 9 illustrates a Gaussian filter applied to an initial column vector to produce a smoothed column vector.

FIGS. 10–12 illustrate the effects of rotation of a feature coordinate grid with respect to a pixel grid.

FIG. 13 illustrates a computational technique for rotating a feature coordinate grid with respect to a pixel grid so that the two grids are aligned.

FIG. 23A shows a small 9×12 molecular array.

FIG. 23B shows a strong matrix corresponding to the 9×12 molecular array of FIG. 23A.

FIG. 24 shows a pseudo-inverse strong matrix calculated from the strong matrix shown in FIG. 23B.

FIG. 25 shows a centroid matrix that includes the coordinates of the centroids of the strong features of the 9×12 matrix shown in FIG. 23A.

FIG. 26 shows a coefficient matrix calculated by multiplying the transpose of the pseudo-inverse matrix (FIG. 24) by the centroid matrix (FIG. 25).

FIGS. 27A–B show the fit positions matrix calculated by multiplying the transpose of a feature indices matrix by the coefficient matrix shown in FIG. 26.

FIG. 30 shows the red intensity values for a feature.

DETAILED DESCRIPTION OF THE INVENTION

Figure 1:
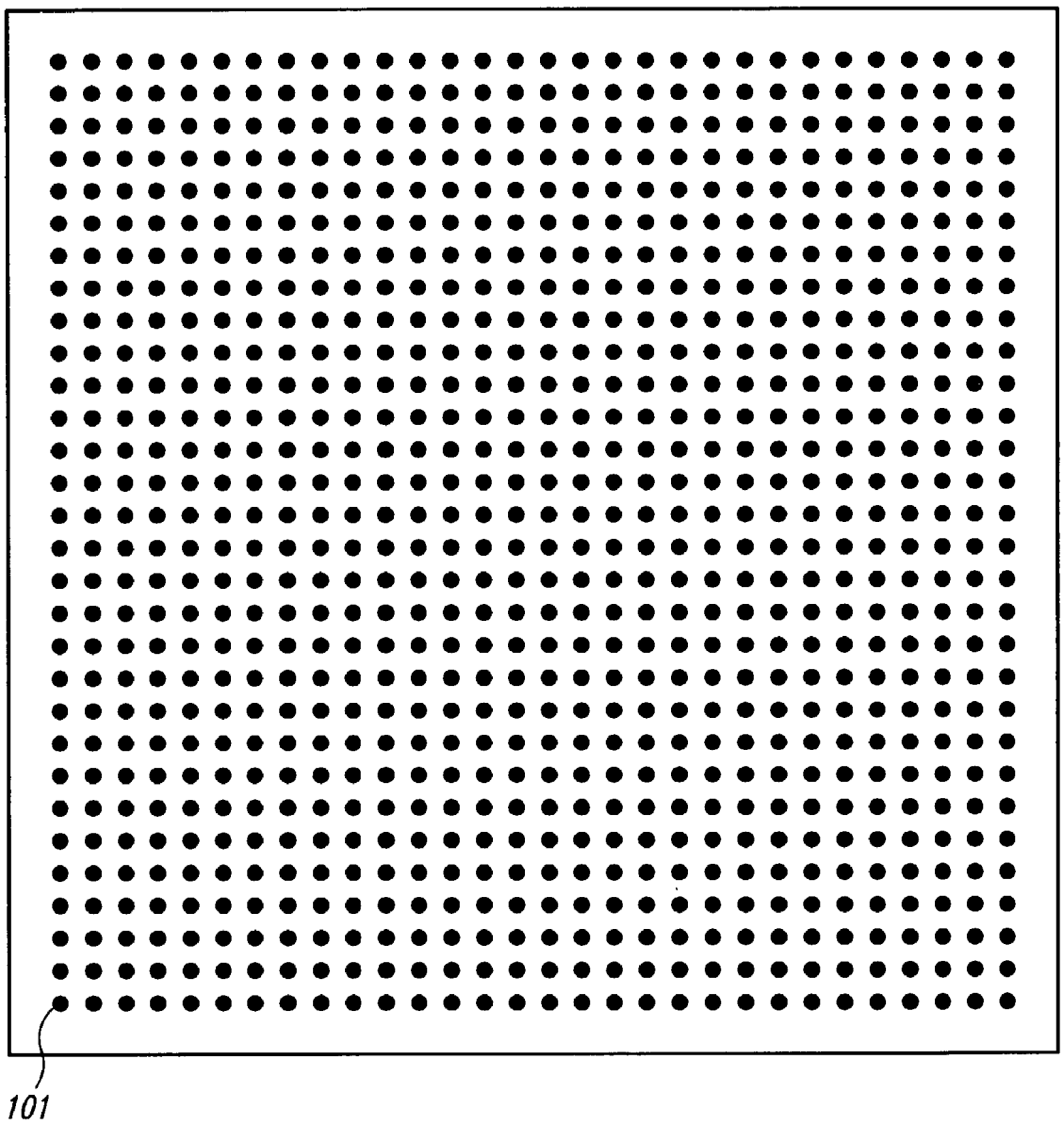
FIG. 1 shows a generalized representation of a molecular array.
Figure 2:
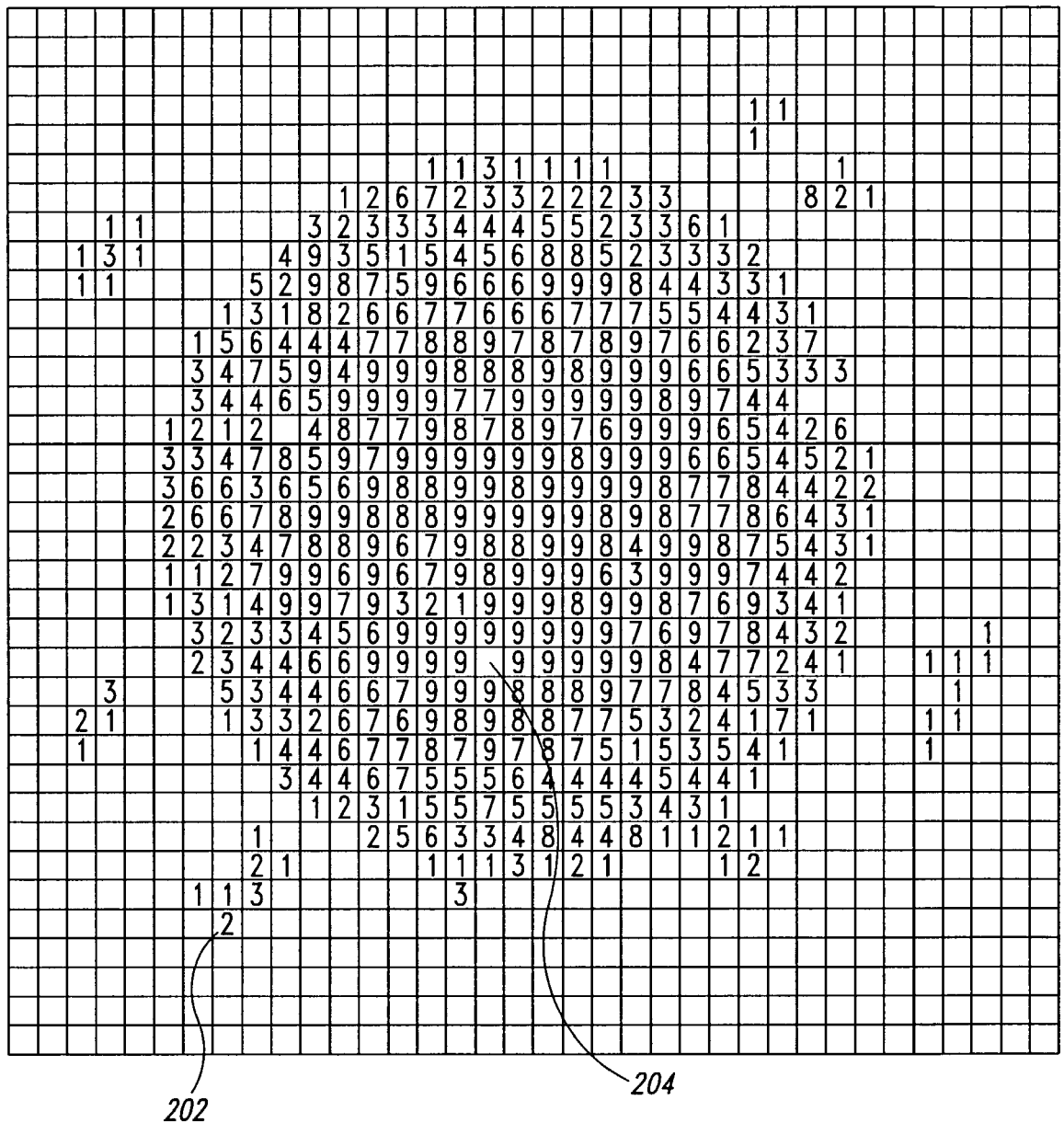
FIG. 2 illustrates a two-dimensional grid of pixels in a square area of a scanned image.
Figure 3:
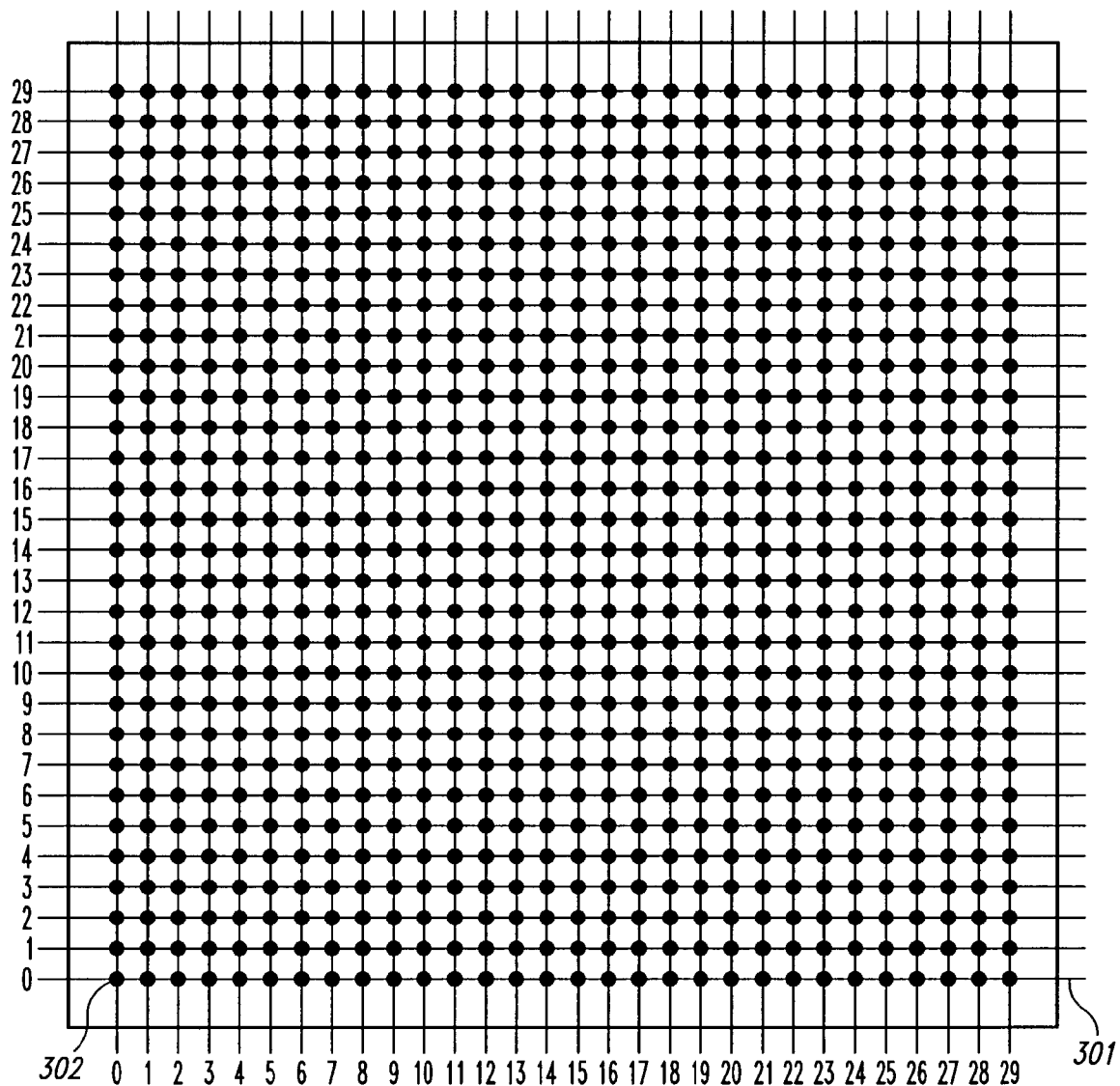
FIG. 3 illustrates indexing of a scanned image produced from a molecular array.

The present invention is directed toward automated feature extraction from scanned images of molecular arrays. Automated feature extraction includes: (1) a determination of the approximate positions of the features, for example by determining the positions of corner features within the scanned image; (2) generation of an initial coordinate system for the scanned image, for example, by using the positions of corner features, or by alternative means, including using mechanically precise positioning of features on the molecular array and of the molecular on the detection device and by using fiducial reference marks incorporated in the molecular array and detected independently, but in spatial alignment with detection of chemical features, and refinement of the initial coordinate system to produce a refined coordinate system; (3) determination of reliable regions of the scanned image from which to extract signal data; (4) and extraction of signal data from the features and local background regions of the scanned image of the molecular array. Each of these four components of automated feature extraction will be first discussed in four subsections, below, using illustrated examples and mathematical expressions. Following the first four subsections, an illustrative implementation of an automated feature extraction system is provided in a fifth subsection. Although the above-listed four components are described in terms of a combined, comprehensive feature-extraction implementation, each component may also be applied separately to discrete data extraction and processing problems.

It should be noted that the term "signal" is employed in the following discussion to indicate the data collected from features of a molecular array by a particular type of analysis. For example, if molecules binding to features are labeled with chromophores, and optical scans at red and green wavelengths of light are used to extract data from the molecular array, then the data collected during the optical scan at the green wavelength may be considered to be the green signal and data collected during the optical scan at the red wavelength may be considered to be the red signal. Signals of additional colors may be collected using additional dye sets. The practical limit to the number of types of signals, or colors, that may be collected is the number of emission spectra that can be independently observed. Using existing technologies, as many as twelve emission spectra may be independently observed. By using combinations of narrow band dyes, such as quantum dots, greater than twelve emission spectra may possibly be independently observed. Another type of signal may be collected by radiometric analysis of the molecular array for localized emission of one type of radiation with minimum energy levels for detection.

The term "signal" is also used to refer to data extracted from a particular feature using a particular type of analysis. It will be clear, from the context in which the term "signal" is used, below, whether "signal" refers to a cumulative set of data collected from a molecular array via a particular type of analysis or to data collected from a particular feature of a molecular array via a particular type of analysis.

Location of the Positions of Corner Features

Figure 4:
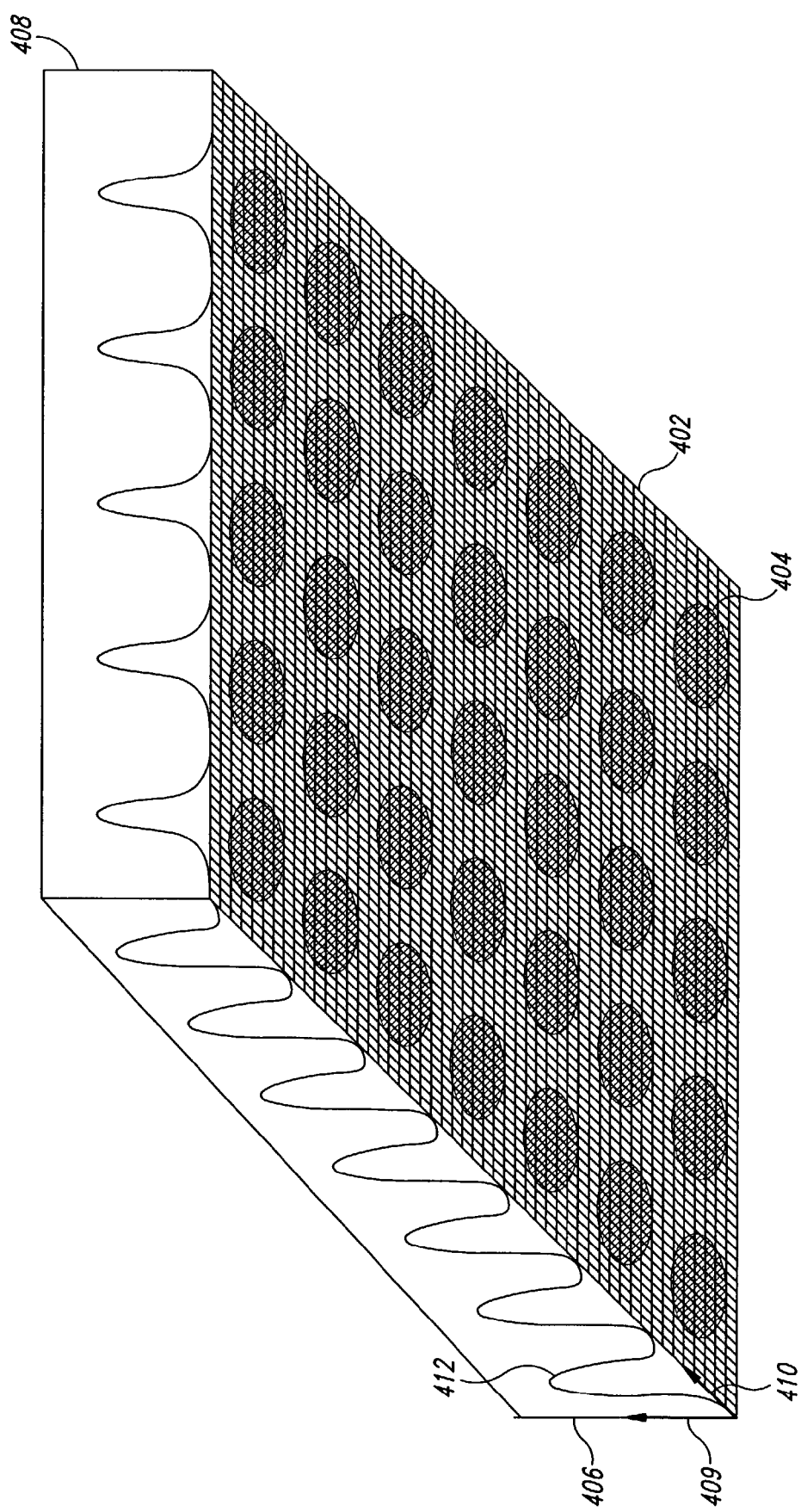
FIG. 4 illustrates an initial step in the determination of the positions of corner features of a scanned image of a molecular array.

FIG. 4 illustrates an initial step in the determination of the positions of corner features of a scanned image of a molecular array. The scanned image of the molecular array 402 is represented in FIG. 4 as a grid of pixels, with the higher-intensity pixels corresponding to features illustrated as dark circles, such as the disk-shaped group of pixels 404 corresponding to a corner feature. The intensity values of the pixels are projected horizontally to form a row vector 406 and are projected vertically to produce a column vector 408. The row vector 406 is illustrated as a two-dimensional graph, where the total projected intensity value is plotted in the vertical direction 409 and the position of each row of pixels is plotted in the horizontal direction 410. Projection of the intensity values of the pixels along the rows produces a wave-like graph 412, in which the peaks correspond to rows of pixels that include the centers of features and the troughs correspond to rows of pixels between features. Summing the intensity values of pixels along columns analogously produces the column vector 408. For two channel images, either channel or the sum of both channels may be used. An option can be specified in the user interface to indicate that one of the two channels, or both channels, are to be used in the column-and-row-vector method for corner finding. Alternatively, the method can be iteratively applied to each separate channel and combinations of channels, and the iteration that produces a best set of corner position, according to one of various metrics, can be selected.

Figure 5:
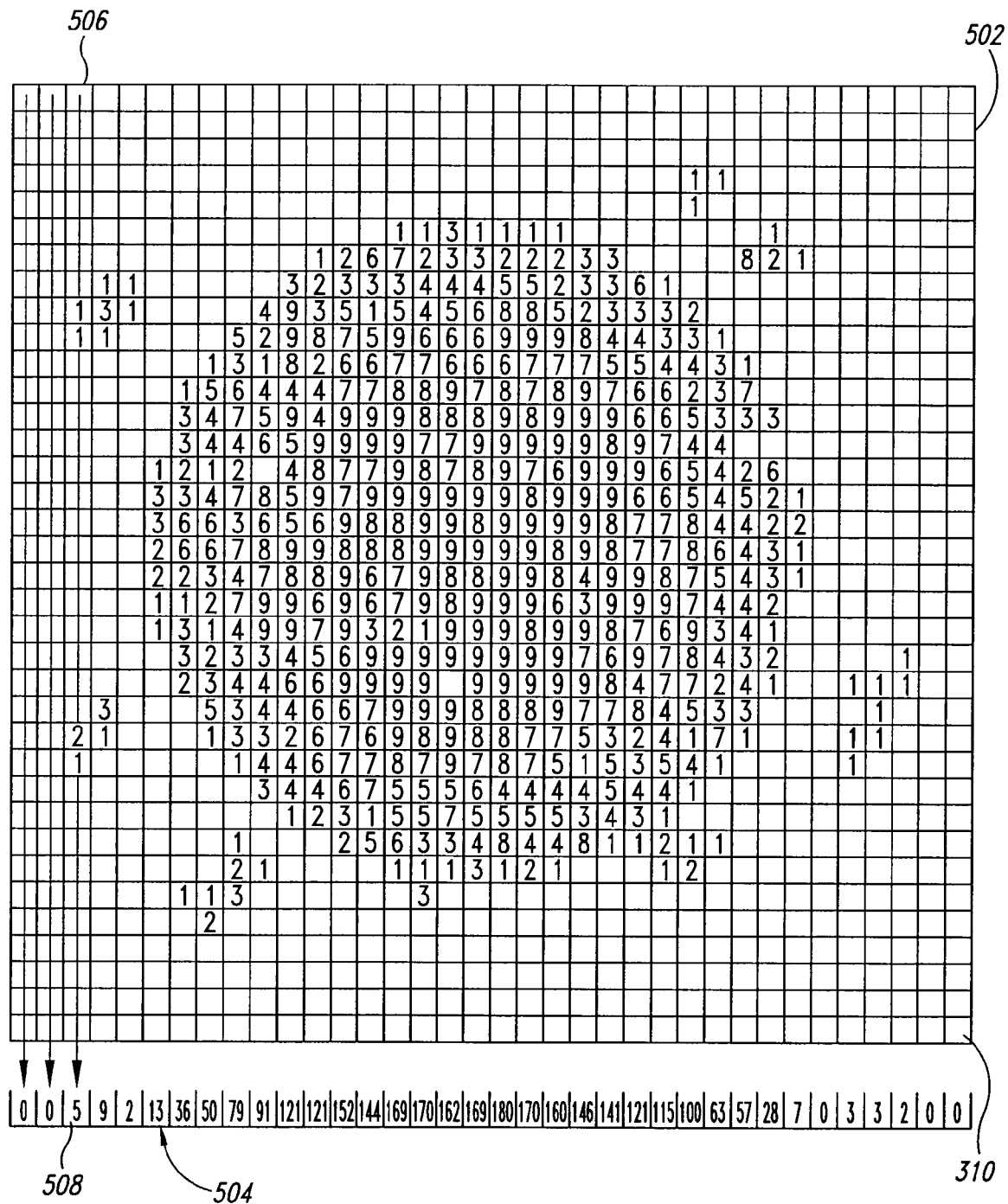
FIG. 5 illustrates a numerical calculation of a portion of the column vector corresponding to a single feature.

FIG. 5 illustrates a numerical calculation of a portion of the column vector corresponding to a single feature. A column vector is calculated for all features, as described in the above paragraph, and contains a number of peaks. However, for the sake of simplicity of illustration, FIG. 5 shows pixel intensity values for a single feature, and the method of column vector calculation will therefore produce a single peak corresponding to the single feature. FIG. 5 shows a grid of pixels 502 representing a square region of a scanned image encompassing a single feature. The intensity values of all the pixels in each column of the grid of pixels 502 are summed, and the sums are entered into the linear array 504. For example, column 506 includes four non-zero pixels having intensity values of: 1,1,2, and 1. Thus, summing all of the intensity values of the pixels in column 506 produces the sum 5 (508 in FIG. 5) in the third element of array 504 corresponding to column 506. Note that, in FIG. 5 and in all subsequent pixel illustrations, 0 intensity values are not explicitly shown, and pixels having intensity value of "0" are shown as blank, or unfilled, squares, such as pixel 510. Note also that other operations such as averaging may be performed as an alternative to summing of rows and columns of pixels to create the row and column vectors.

Next, the row and column vectors (406 and 408 in FIG. 4) may be computationally smoothed, for example, by applying a Gaussian filter. The smoothing process is illustrated in FIGS. 6–9 using the example of FIG. 5. As with FIG. 5, FIGS. 6–9 use a single-peak column vector calculated from a single feature for the sake of simplicity of illustration. In general, the smoothing process is applied to multi-peak row and column vectors, such as those illustrated in FIG. 4. FIG. 6A shows the initial column vector computed from the pixel grid of FIG. 5, with the column positions shown as the left-hand column of FIG. 6A 602 and the sum of the intensities of the pixels in each column shown in column 604. Thus, for example, it can be seen in FIG. 6A that the sum of the intensity values of the pixels in column 14 (606 in FIG. 6) is 169 (608 in FIG. 6). FIG. 6B shows the column vector of FIG. 6A following smoothing. FIG. 7 graphically illustrates the initial column vector of FIG. 6A, and FIG. 8 graphically illustrates the smoothed column vector of FIG. 6B. In FIGS. 7 and 8, the vertical axes (702 and 802 in FIGS. 7 and 8, respectively) represent the sum of pixel intensities in a column, and the horizontal axes (704 and 804 in FIGS. 7 and 8, respectively) represent the position of the columns measured in units of pixels. Comparing FIG. 7 to FIG. 8, it can be observed that the smoothing process eliminates or smoothes the occasional sharp peaks, such as peaks 706–711 in FIG. 7.

FIG. 9 illustrates a Gaussian filter applied to an initial column vector to produce a smoothed column vector. The Gaussian filter is a discrete function with values for a range of pixel positions within a column or row vector. The value for the sum of pixel intensities at pixel position 0 (902 in FIG. 9) is 0.5 and the value of the Gaussian filter function for pixel positions 1 and −1 (904 and 906 in FIG. 9, respectively) are both 0.25. This Gaussian filter is convolved with an initial column vector or an initial row vector to produce a smooth column vector or smooth row vector, respectively. The convolution operation for discrete functions involves overlaying the central position of the Gaussian filter at each position, or value, in a row or column vector and calculating the smoothed row or column vector value for that position by multiplying the Gaussian filter function with the row or column vector, respectively. Thus, for example, the value 4.75 (610 in FIG. 6B) corresponding to column position 2 (612 in FIG. 6B) is generated by centering the Gaussian filter of FIG. 9 over the value representing the sum of intensities for column 2 (508 in FIG. 5) of the initial column vector (504 in FIG. 5) and multiplying the resulting Gaussian filter function and the initial column vector. Because the Gaussian filter is 0 for all pixel locations other than −1, 0, and 1, multiplication of a Gaussian filter centered on element 508 of the column vector of FIG. 5 produces the following result: 0.5*5+0.25*9=4.75. Many other smoothing filter techniques may be employed, including the median filter technique, to be discussed below.

In certain cases, there may be slight rotational discrepancies between the orientation of the rectilinear grid of pixels and the orientation of the rectilinear coordinate grid that describes and indexes the centers of features within the scanned image. Such discrepancies may arise when the rows and columns of features of the molecular array are rotated with respect to the horizontal and vertical axes of the scanning device. FIGS. 10–12 illustrate the effects of rotation of the feature coordinate grid with respect to the pixel grid. In FIG. 10A, the pixel grid and the feature coordinate grid are both aligned, producing a column vector shown in FIG. 10B with sharp and distinct peaks and troughs. In FIG. 11A, the pixel grid is rotated slightly counterclockwise with respect to the feature grid, producing a column vector, shown in FIG. 11B, with relatively shallow peaks and troughs, since relatively high-intensity pixels occur in each column of pixels. In FIG. 12A, the pixel grid is rotated slightly clockwise with respect to the feature coordinate grid, producing a column vector, shown in FIG. 12C, with shallow peaks and troughs. Thus, to correctly orient the feature coordinate grid with respect to the pixel grid, row and column vectors can be calculated for a range of rotations of the feature grid with respect to the pixel grid, and the rotation producing the column and row vectors having the most distinct peaks and troughs can be determined to be the correct orientation of the feature coordinate grid with respect to the pixel grid. This technique need be employed only when the rotational discrepancy, for a rectilinear array, is greater than θ calculated as follows:

$$\sin \theta$$

$$\sin \theta \approx 2S/L$$

where:
S=spacing of features in the x direction
L=length of the molecular array in the y direction FIG. 13 illustrates a computational technique for rotating the feature coordinate grid with respect to the pixel grid. Using the rotation angle determined by the method described in FIGS. 10–12, represented in FIG. 13 by the symbol "θ," the positions within the scanned image can be determined with reference to a rotated pixel grid by multiplying the original coordinates of each point by a rotational matrix to generate new, transformed coordinates for the rotated pixel grid according to the following matrix equation:

$$(x_0, y_0) \begin{pmatrix} \cos\theta & \sin\theta \\ -\sin\theta & \cos\theta \end{pmatrix} = (x_n, y_n)$$

However, there may be areas within the new coordinate space, such as area 1302, that do not correspond to physical regions within the scanned image, and conversely, there may be regions in the original scanned image, such as region 1304, which lie outside the new, rotated pixel coordinate system. If the angle of rotation is small, the amount of non-overlapping regions, such as regions 1302 and 1304, may be relatively insignificant, and may be computationally accounted for by simply decreasing the dimensions, in pixels, of the rotated coordinate system.

In non-rectilinear feature arrangements, similar techniques can be applied to orient an indexing scheme with respect to scanned images of the surface of a molecular array. For example, if the features are arranged in circles of increasing radii from a central point, then radial vectors may be calculated at various angles about a located central feature. In general, an orientation providing summed intensity profiles that most closely corresponds to idealized intensity profiles may be chosen for an appropriate indexing scheme.

To facilitate corner feature position estimation, the corner features of molecular arrays may be manufactured to contain a control substance that produces a strong signal, referred to as a "positive control," as well as another control substance that produces a weak signal near background level, referred to as "a negative control." The appropriate placement of positive and negative controls in the corners provides "soft fiducials". Placement information for soft fiducials is stored in a design file. Each molecular array may be associated with a design file that can be accessed electronically and that annotates the probe type and probe sequences for each feature position on the array.

Because certain molecular array scanners do not produce distorted images, but only rotated images, only three of the four corners are necessary to fully determine the grid for these molecular array scanners. A grid-determining routine can, in this case, determine the best three out of four corners, according to a metric for evaluating corner positions, before attempting to refine the grid based on strong features. One possible metric is to compute the angular distortion and the size error for combinations of three corner positions, and to then select the three corner positions that yield the smallest angular distortion and the smallest size error. The user interface can be simplified to allow a user to enter any three corners when manually specifying corners.

An alternative method of determining corners of an array uses the design file associated with a molecular array in order to choose a sub-section of the array on which to perform corner analysis. For example, a small subsection in the upper left corner of a molecular array may be selected by querying the design file to find a region with a desired number of positive controls and a desired number of negative controls. This process may then be repeated for the lower right corner. A mask may then be made with these two sub-sections held in the correct distance from one another, in accordance with information stored in the design file. Convolutions can then be performed in all directions, including horizontal, vertical, diagonal, and rotational directions, using an algorithm such as a minimizing least squares algorithm in order to find the area of the scan which best matches this mask. This method may be faster than the algorithms discussed above, since the above-discussed algorithms perform calculations on the entire array. In addition, this method may be more robust with regard to large signal spikes in the background regions and other signal artifacts on the molecular array. If an area of very high background or other array artifact were present in the initial mask, an acceptable solution may not be produced by the previously discussed algorithms. The current algorithm detects the goodness of fit and, if necessary, iterates. For instance, increasingly large sub-sections may be iteratively chosen for processing until an acceptable solution is found.

Figure 14:
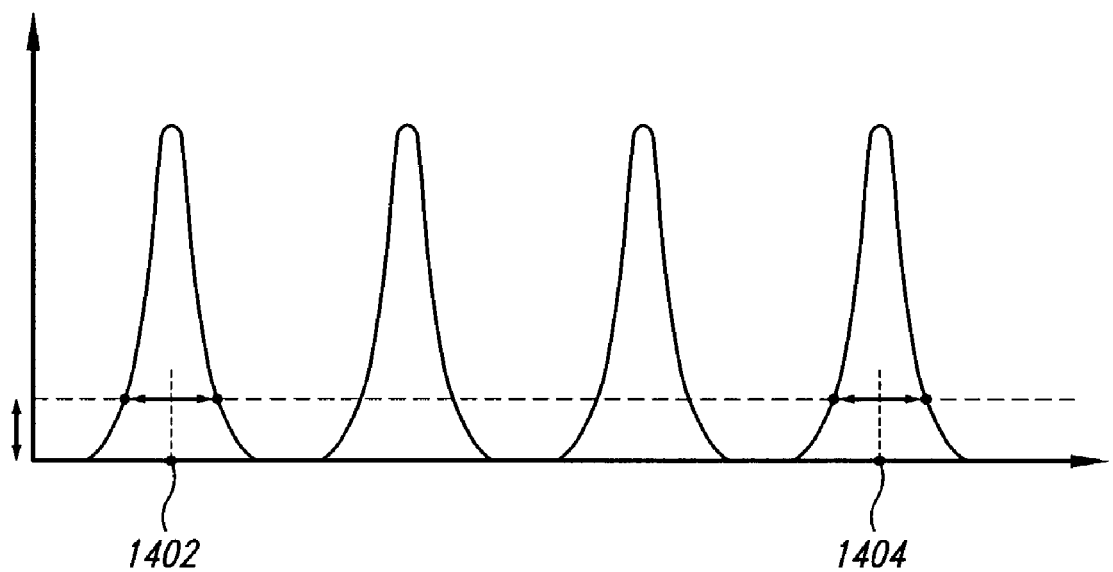
FIG. 14 illustrates one technique for determining corner feature positions in pixel coordinates.

Once the pixel grid and feature coordinate grid are aligned, the positions of the corner pixels can be estimated from the smoothed column and row vectors. FIG. 14 illustrates one technique for determining corner feature positions in pixel coordinates. Assuming that the vector in FIG. 14 is a column vector, then the x coordinate 1402 of the left-hand corner features can be estimated from the position of the first peak in the column vector, and the x coordinate, in pixels, of the right-hand corner features 1404 can be estimated from the position of the last peak in the column vector. The y coordinates of corner features may be similarly determined from the smoothed row vector.

Peak finding is performed using statistics gathered from the smoothed row and column vectors. The first rising and falling edge is used to find the first peak while the last rising and falling edge is used to find the last peak. In order to locate these edges, an appropriate threshold is used. This threshold can be set using statistics of the smoothed row and column vectors such as the median, i.e. fifty percentile, or another percentile and some multiple of the standard deviation. For example, for relatively low-density arrays in which the total area of the features is less than the total area of the background, the median is a good approximation of the valleys between the peaks. An appropriate threshold in this case would be the sum of the median and one standard deviation. For higher density arrays in which the ratio of the total area of the features to the total area of the background increases, the $30^{th}$ percentile may be a more appropriate estimation of the valleys.

Additional image processing techniques may be employed to circumvent various problems in finding the corner features. For example, abnormally bright or dim areas introduced in the scan due to chemical, biological, or electrical anomalies may distort the corner finding process. These bright or dim areas may be large or small, thus creating hard-to-predict problems for the corner finding algorithm. To alleviate the impact of small area anomalies, a median filter can be used on the row and column vectors with a kernel sized large enough to eliminate significantly sized spikes, but small enough to allow peaks corresponding to features to remain. To alleviate the impact of large area anomalies, boxplot analysis or similar statistical analysis can be used to set abnormally high or low values to a reasonable number. For example, using the bloxplot method, the limits of the whiskers of the bloxplot can be used to constrain the values of data points of smoothed row and column vectors between a maximum and minimum value. Statistics for peak finding can then be recalculated based on the constrained-value data points.

Furthermore, information about the design of the array can be incorporated into the corner finding step. Information such as the number of rows and columns of features, the expected feature size, and the distances between features can be used to make the corner finding algorithms more robust. Peak finding algorithms can be iterated, each time changing the threshold value until the corners found meet the design specifications. Additionally, the peak finding algorithm can be made more exhaustive to find various numbers of peaks and to find combinations compatible with the design information.

The technique illustrated in FIG. 14 is especially suitable for printed molecular arrays, in which features are relatively well spaced apart within the molecular array, as shown in FIG. 1. In other types of molecular arrays, the features may be much more densely packed. In densely packed arrays having disk-shaped features, with features packed together in a two-dimensional version of the familiar closest packing lattice in which oranges are stacked in display counters, each internal feature may touch, or nearly touch, six nearest-neighbor features. For such densely packed molecular arrays, column and row vectors may be calculated as described above, although the angle between the directions along which pixel intensity values are summed may be different than the 90° angle in the rectilinear case. For example, angles of 30°, 60°, 120°, etc. may be used for hexagonal closest-packed arrays.

Figure 15:
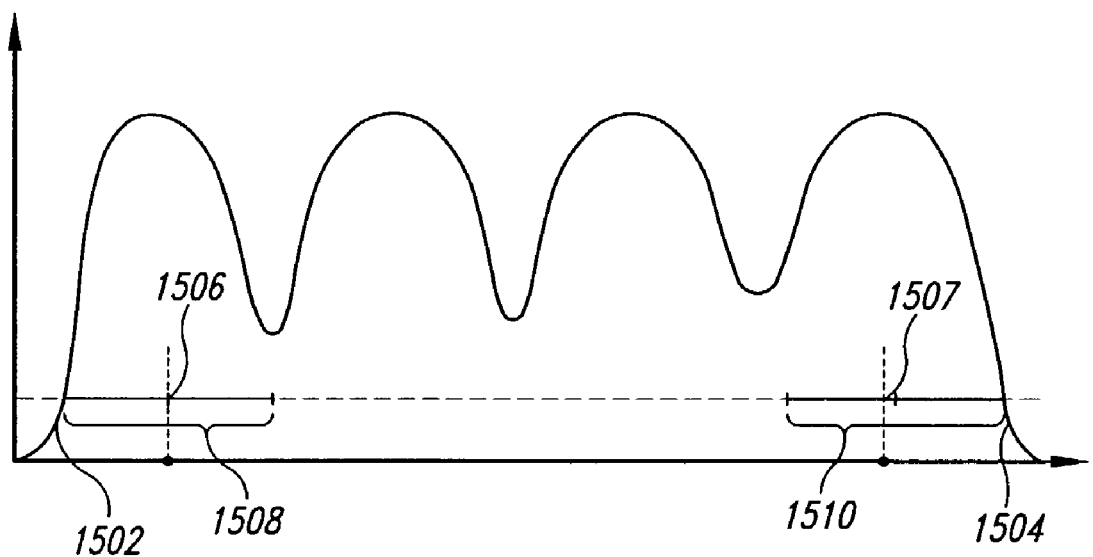
FIG. 15 illustrates a corner feature estimation technique more suitable for densely packed molecular arrays.

FIG. 15 illustrates a corner feature estimation technique more suitable for densely packed molecular arrays for which row and column vectors have broader, less distinct peaks and valleys. In FIG. 15, the row vector has broader and less distinct peaks than the row vector illustrated in FIG. 14. In this case, the x coordinates of corner features can be estimated by detecting the first rising edge 1502 and last falling edge 1504 of the column vector, and then estimating the positions of the centers of the corner features as the mid points 1506–1507 of the known feature sizes 1508 and 1510 extending to the right from the first rising edge and to the left from the last falling edge. The y coordinates of corner features can be similarly determined from a smoothed row vector.

Once the x and y coordinates, in units of pixels, of the positions of the corner features are estimated from row and column vectors, as illustrated above, regions of a scanned image corresponding to the corner features can be further analyzed to refine the estimated positions of the corner features. One technique for refining the positions of features is called "blob analysis." Blob analysis comprises the analysis of pixels within a region of interest encompassing the estimated position of a feature in order to first determine a threshold pixel intensity value and to then create a binary image in which all pixels having pixel intensity values greater than the threshold value are assigned the value "1," and all pixels having pixel intensity values in the region of interest less than the threshold value are assigned the value "0." The coordinates of the centroid of the connected collection of pixels closest to the center of the region of interest in the binary image is then taken to be the refined pixel coordinates corresponding to the center of the feature.

Figure 16:
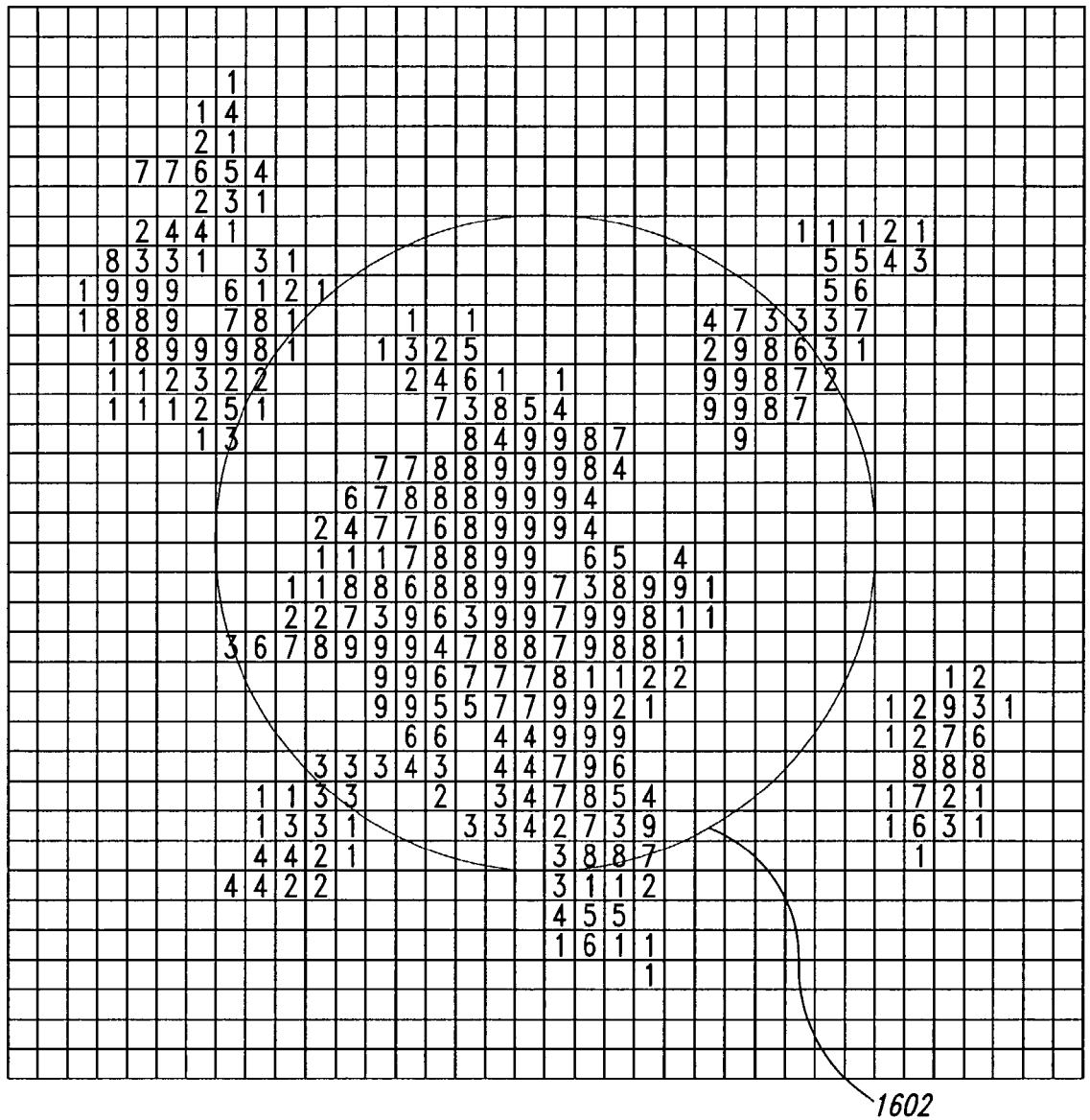
FIGS. 16–17 illustrate one method for threshold determination for blob analysis.
Figure 17:
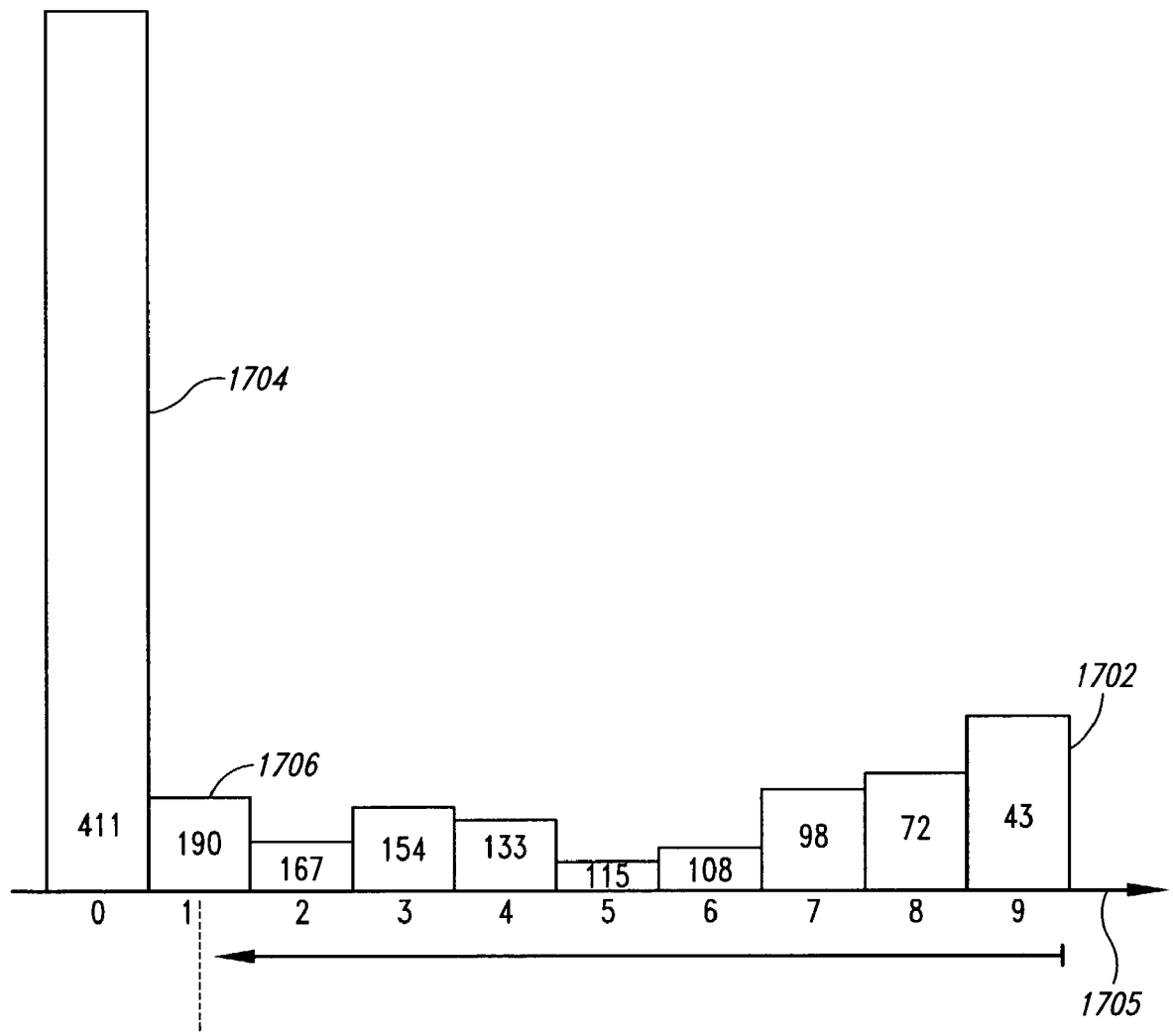

FIGS. 16–17 illustrate one method for threshold determination used in blob analysis. FIG. 16 illustrates an inner region of interest. In FIG. 16, a square area of the scanned image centered at the estimated position of a feature is shown. An elliptical area 1602 having a minimum size that totally encompasses the feature that is centered within the area of the scanned image of the feature shown in FIG. 16. This elliptical area is called an "inner region of interest." A threshold for the inner region of interest is determined by creating a histogram of the various pixel intensity values occurring within the inner region of interest. FIG. 17 shows a histogram of pixel intensity values within the inner region of interest illustrated in FIG. 16. A threshold pixel intensity value is determined from the histogram by proceeding from the right-most column of the histogram 1702 towards the left-most column of the histogram 1704 until a threshold point in the distribution of pixels is reached. In the illustrated embodiment, the threshold point is predetermined to be the $33^{rd}$ percentile point. The threshold point may be optimized according to characteristics of the features and the arrays being analyzed, including size, detected noise levels, and measured positioning errors. The pixel intensity value at that point on the x-axis of the histogram is then taken to be the threshold value. In the case of the inner region of interest shown in FIG. 16, pixel intensity values range from 0 to 9, and so the histogram of FIG. 17 has ten vertical columns representing pixel intensity values 0 to 9. The number of pixels with a given intensity value is represented by the height of the corresponding column. The point on the x-axis 1704 of the histogram in FIG. 17 at which ⅔ of the pixels occur to the right and ⅓ of the pixels occur to the left falls within the column of the histogram 1706 corresponding to a pixel intensity value of 1. Thus, the threshold value of 1 is used to create a binary map for the inner region of interest of FIG. 16.

Figure 18:
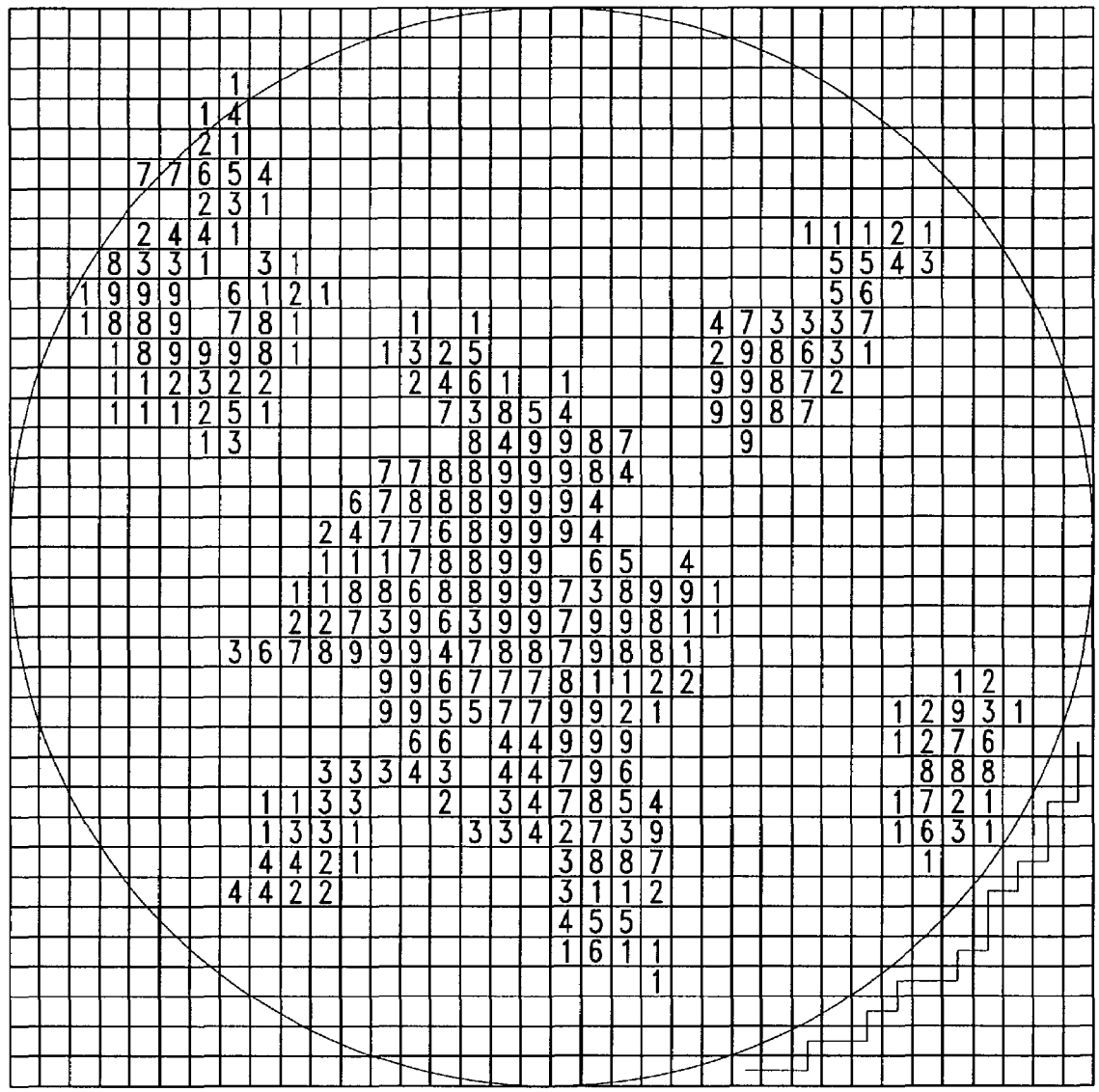
FIGS. 18 and 19 illustrate a second technique for choosing a threshold for blob analysis.
Figure 19:
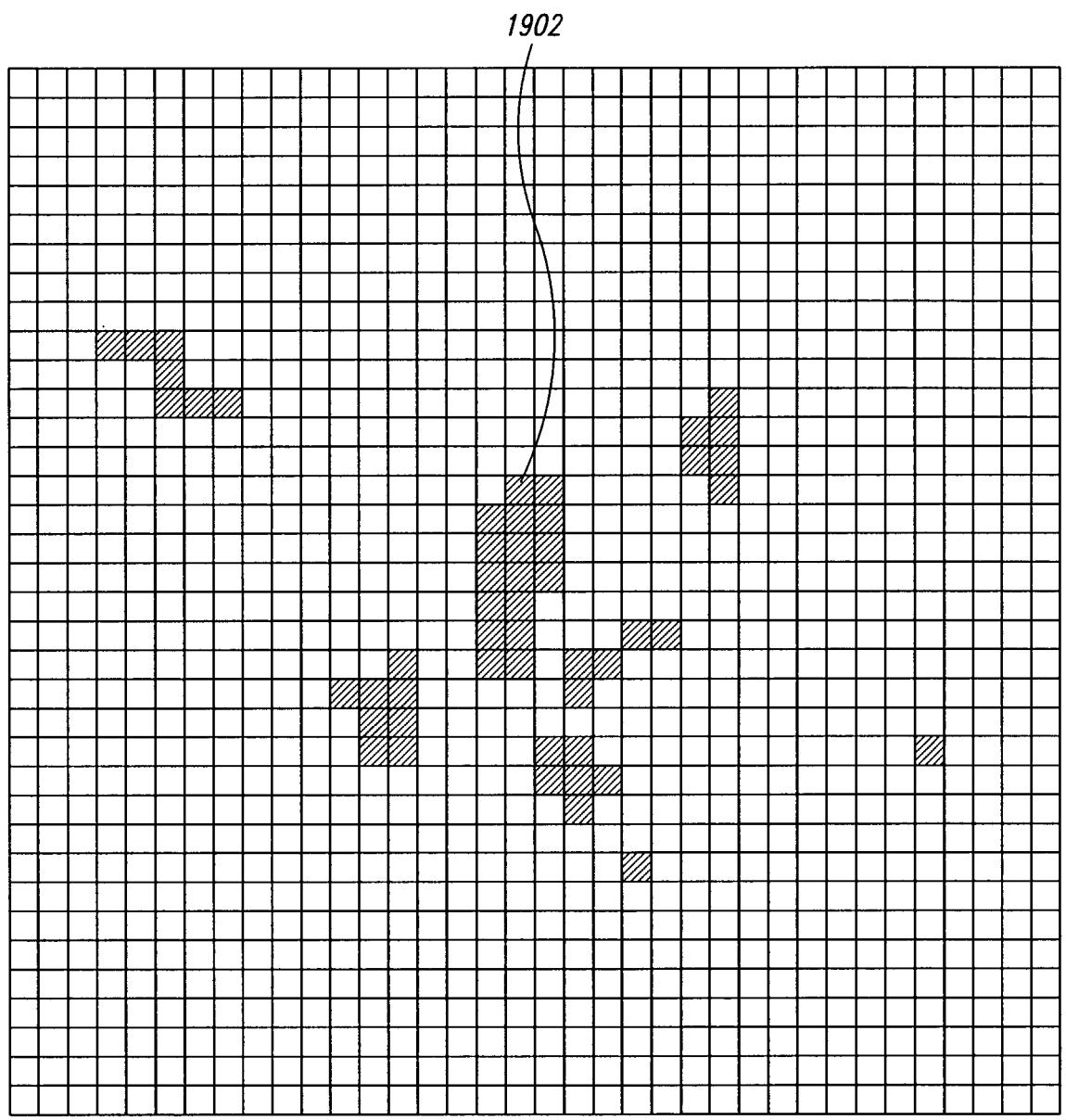

FIGS. 18 and 19 illustrate a second technique for choosing a threshold for blob analysis. FIG. 18 illustrates an outer region of interest for the same area of the scanned image as shown in FIG. 16. The outer region of interest is the maximally sized elliptical area that will fit within the rectangular portion of a scanned image overlaying and centered on a particular feature. The median pixel intensity for pixels within the outer region of interest ("OuterROI"), and the standard deviation for the pixel intensities of pixels within the OuterROI, are both calculated for the OuterROI, and a threshold is chosen by:

threshold=median of OuterROI+(A*standard deviation)

where A is approximately equal to 1.4. Applying the above method for calculating a threshold produces a threshold value of "9" for the OuterROI illustrated in FIG. 18. FIG. 19 shows the binary image produced using a threshold of 9 from the rectangular portion of the scanned molecular array image shown in FIG. 18. In FIG. 19, all pixels having a pixel intensity in the original scanned image equal to or greater than nine are darkened, or filled in, and all other pixels are blank. The darkened pixels correspond to pixels having an intensity value of 9, and the blank pixels correspond to pixels having a value less than 9 in the binary image. The average or mean of pixel values may be used in place of the median pixel value in the above equation in order to generate alternative threshold values.

A variation of this second method of determining thresholds is to use median statistics, which are more robust to outlier pixels than statistics using mean and standard deviations. A more robust estimator of standard deviation is either the inter-quartile range ("IQR"), where IQR=($75^{th}$ percentile-$25^{th}$ percentile) or the median absolute deviation ("MAD") from the median statistic metrics, which are converted to a standard deviation equivalent by dividing by a known constant (e.g. 1.35 for IQR and 0.675 for MAD). For example, the threshold may be calculated as:

threshold=median of OuterROI+(A*standard deviation-equivalent)

Figure 20:
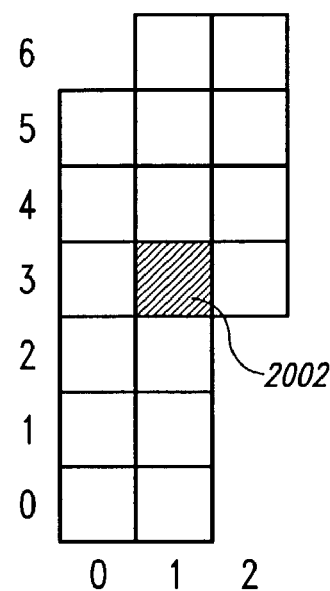
FIG. 20 illustrates the centroid pixel of the largest blob shown in FIG. 19.

Whether the binary image is produced according to the technique illustrated in FIGS. 16 and 17 or according to the technique illustrated in FIGS. 18 and 19, the resulting binary image is processed similarly to generate a refined pixel coordinate position for the features. The binary image is scanned to locate sets of contiguous pixels having a value of "1," or, in other words, blobs. Blob 1902 in FIG. 19 is the blob containing the largest number of pixels in the binary image and is closest to the center represented by FIG. 19. Then, the centroid of the blob greater than a threshold size closest to the center of the binary image is computationally determined by a method illustrated in the final subsection of the application. FIG. 20 illustrates the centroid pixel of blob 1902 of FIG. 19. In FIG. 20, the centroid pixel 2002 is shown as a darkened pixel. The coordinates of the centroid pixel within the scanned image are then taken as the refined coordinates for the feature.

Figure 21:
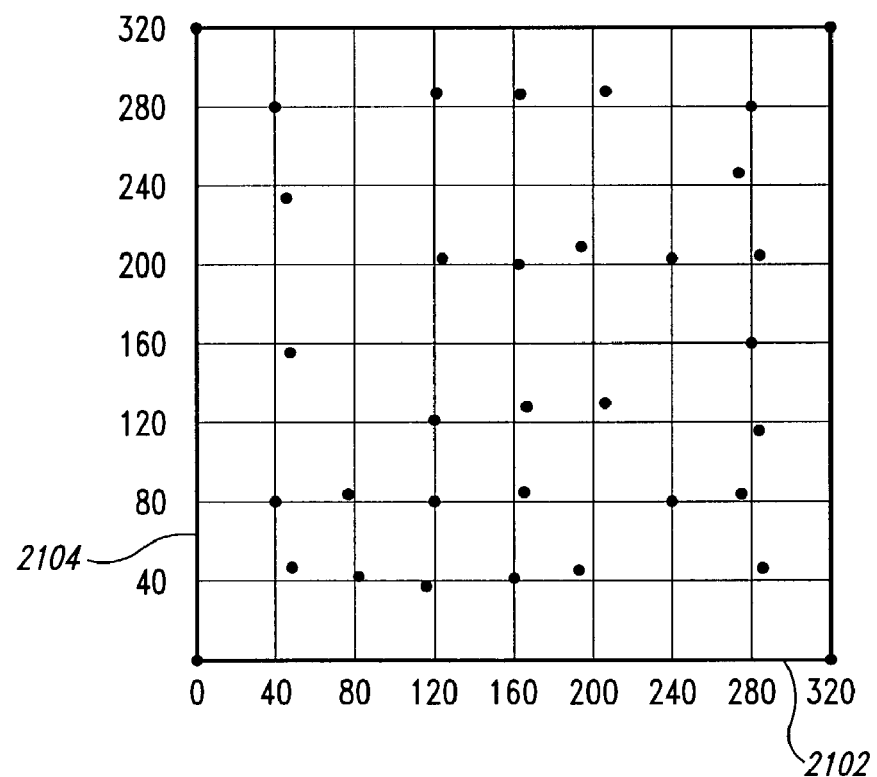
FIG. 21 illustrates an initial feature coordinate grid overlaying the scanned image of a molecular array.

Computation of an Initial Feature Position Coordinate Grid and Refinement of the Feature Position Coordinate Grid Using the refined corner feature positions, as determined by the techniques described in the previous subsection, an initial rectilinear feature coordinate grid can be estimated from the positions of the corner features and the known inter-feature spacings of the molecular array. FIG. 21 illustrates an initial feature coordinate grid overlaying the scanned image of a molecular array, where the units of the x-axis 2102 and the units of the y-axis 2104 are pixels. As can be seen in FIG. 21, many of the features are positioned relatively closely to the intersection of feature coordinate grid lines, but do not exactly correspond to the intersections. Thus, a technique is required to refine the initial feature coordinate grid so that features observed in the scanned image correspond as closely as possible to the intersections of feature coordinate grid lines. In this and following discussions, it is assumed that the molecular array is optically scanned in both green and red wavelengths and includes separate green and red intensity values for each pixel. In different systems, more than two signals may be produced during analysis of the molecular array, and in such systems, all the various signals are used in the techniques to be described below.

After computing the initial feature coordinate grid, the different signals for each feature are processed in order to select strong features and to then refine the initial feature coordinate grid based on the positions of the strong features. For each feature, blob analysis is conducted, as discussed above with reference to FIGS. 16–20, to produce refined pixel coordinates for the center of the feature for each signal along with the size of the blob used to produce the refined coordinates. The initial position of the feature is estimated from the initial feature coordinate grid. If, based on the original feature coordinate grid, the refined position for the feature is less than some constant distance from the estimated feature position and the size of the blob determined by blob analysis is greater than a minimum threshold value and less than a maximum threshold value, then the feature is considered to be a strong feature. Otherwise, the feature is considered to be a weak feature. In FIG. 21, only the strong features are shown. If a feature is strong in more than one signal, such as, in the current case, in both green and red pixel intensities, then the refined position of the feature will be calculated as the mid-point of a line segment connecting the refined positions of the feature based separately on the red and green signals.

Figure 22:
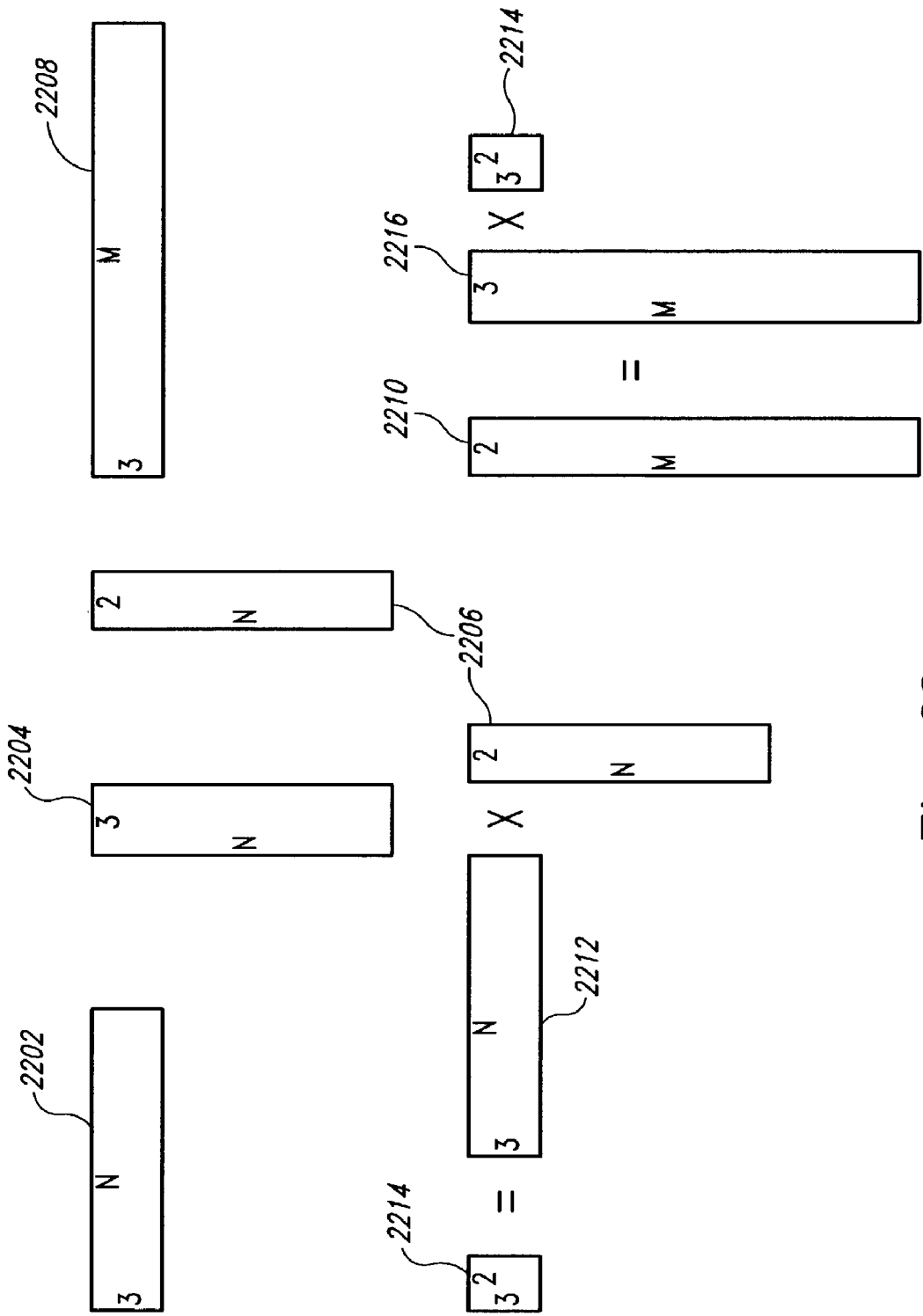
FIG. 22 illustrates a linear regression analysis used in one embodiment of the present invention.

Once the strong features are selected by the above-described technique, then the positions of the strong features are employed in a linear regression analysis to produce a refined feature coordinate grid. FIG. 22 illustrates the linear regression analysis used in one embodiment of the present invention. In FIG. 22, matrices are represented as rectangles, with the dimensions of the matrices indicated by numbers and letters within the rectangles. In FIG. 22, the value "M" is equal to the total number of features within a molecular array and the value "N" is equal to the number of strong features found within the molecular array. The row and column spatial indices of these strong features are contained in an N×3 strong matrix 2202. The indices of strong features are contained in two columns of the strong matrix. A third column in the strong matrix 2202 has a placeholder value of "1."Thus, the first row in the strong matrix 2202 contains a first spatial index for each strong feature, the second row in the strong matrix 2202 contains a second spatial index for each strong feature, and the third row in the strong matrix 2202 contains the value "1" for each strong feature.

A second matrix employed in the linear regression analysis is the pseudo-inverse strong matrix 2204. This is an N×3 matrix. A pseudo-inverse matrix $A^+$ is derived from a regular matrix A containing real number elements via singular value decomposition. For a matrix $A \in R^{M \times N}$ ($M \geq N$) with Rank (A)=N there are matrices:

$$U \in R^{M \times N}$$

$$\Sigma \in R^{M \times N}$$

$$V \in R^{M \times N}$$

such that:

$$U^T U = I_N$$

$$V^T V = I_N$$

$$A = U \Sigma V^T$$

Here $I_N$ is the identity matrix in $R^{N \times N}$. The matrix $\Sigma$ is a diagonal matrix with non-zero diagonal entries having decreasing values from the upper left corner, $\Sigma_{(1,1)}$, to the lower right corner, $\Sigma_{(N,N)}$.

The pseudo-inverse matrix for A, denoted by $A^+$ is given by $$A^+ = V \Sigma^{-1} U^T \in R^{N \times M}$$

The important property of $A^+$, and the one used in the grid fit regression process, is that:

$$A^+ A = I_N$$

The reference book "Matrix Computations" by H. Golub and C. F. Van Loan, Johns Hopkins University Press, 1996 (3rd edition), can be consulted for details on application and properties of the singular value decomposition (SVD) $A = U \Sigma V^T$ and the pseudo-inverse.

A third matrix used in the linear regression analysis is the centroid matrix 2206. This is an N×2 matrix, with each row containing the centroid of a strong feature, as determined by blob analysis, in pixel coordinates. A fourth matrix used in the linear regression analysis is a feature indices matrix 2208. The feature indices matrix is a 3×M matrix containing the indices of all features in the molecular array, and is similar in format to the strong matrix 2202. Like the strong matrix, the final row of the features indices matrix 2208 contains M instances of the value "1"

The result of linear regression analysis is a fit position matrix 2210. This is an M×2 matrix containing the two-dimensional pixel coordinates of each feature in the molecular array resulting from linear regression analysis.

The linear regression analysis comprises two matrix multiplications. In the first matrix multiplication, the transpose 2212 of the pseudo-inverse strong matrix 2204 is multiplied by the centroid matrix 2206 to produce a 3×2 coefficient matrix 2214. In the second matrix multiplication, the transpose 2216 of the feature indices matrix 2208 is multiplied by the coefficient matrix 2214 to produce the fit position matrix 2210.

The grid fitting process entails an additional procedure for applying a linear regression on all of the positions for all strong features simultaneously to transform the set of grid positions of strong features to a uniformly spaced grid that better fits the data and that can provide good estimates of the positions of the weak features. The relationship between the positions, X, of a uniformly spaced set of features and the set of indices, J, for that same set of features is given by:

$$X = JC$$

where C is a 3×2 transformation matrix that contains orientation information pertaining to the rotation and offsets of the grid. Consider X to include only the positions of the N strong features and let J represent the corresponding indices. X is an N×2 matrix, where the $i^{th}$ row holds the position of the $i^{th}$ feature. In practice, the strong feature positions, $X_{meas}$, are measured based on their centroids, and these positions deviate slightly from the theoretical grid positions, X. Moreover, $X_{meas}$ is not uniformly spaced. To estimate the transformation matrix C to be applied in the linear regression, the above equation is rewritten as:

$$X_{meas} \cong JC$$

A least squares approximate solution for C can be found by applying the pseudo-inverse of J, as follows:

$$C \cong \text{pinv}(J) X_{meas}$$

Once this equation is solved for C, the transformation may be applied to any set of features, such as G, the index matrix for the set of all features in the grid. This gives us H, the positions of all the uniformly spaced positions of all features on the grid:

$$H = GC$$

An example of the linear regression analysis is provided in FIGS. 23A–27B. FIG. 23A shows a small 9×12 molecular array. The molecular array 2302 contains strong features shown as light-colored disks, such as strong feature 2304. FIG. 23B shows the strong matrix corresponding to the 9×12 molecular array of FIG. 23A. The indices of all strong features are included in the strong matrix 2308. For example, the coordinates of the strong feature 2310 at position (0,0) are included in the first column 2312 of strong matrix 2308 and the coordinates of the strong feature 2304 at position (3,8) are included in column 2314 of strong matrix 2308. As explained above, a third place-keeping coordinate having the value "1" is included in the third row of the strong matrix 2308 for each strong feature. It should be noted that, although a strong feature is not shown at position (7,0) 2306, an artifact or defect within the molecular array has caused detection of a strong feature at position (7,0) 2316.

FIG. 24 shows a pseudo-inverse strong matrix calculated, as described above, from the strong matrix shown in FIG. 23B. FIG. 25 shows the centroid matrix that includes the pixel coordinates of the centroids of the strong features of the 9×12 matrix shown in FIG. 23A. FIG. 26 shows the coefficient matrix calculated by multiplying the transpose of the pseudo-inverse matrix (FIG. 24) by the centroid matrix (FIG. 25). FIGS. 27A–27B show the fit positions matrix calculated by multiplying the transpose of the feature indices matrix (not shown for the current example) by the coefficient matrix (FIG. 26). Note also that the two-dimensional coordinates for any given feature resulting from linear regression analysis can be obtained by multiplying an index vector for the feature by the coefficient matrix shown in FIG. 26. For example, multiplication of the index vector (0,0,1) by the coefficient matrix shown in FIG. 26 results in the coordinates (85.880412, 26.859797) in the first row 2702 of the fit positions matrix shown in FIG. 27A–B. Similarly, multiplication of the index vectors (1,0,1) and (0,1,1) generate the coordinates in rows 2704 and 2706, respectively, of the fit positions matrix shown in FIG. 27A. Note that, for very large arrays, a smaller set of features may be chosen for the linear regression analysis described above.

In subsequent signal extraction and signal variance calculations, the refined positions of the strong features, as determined by blob analysis for each signal, are used for calculations of the strong features and their respective local background regions, whereas the fitted positions enumerated in the fit positions matrix are used for weak features and their respective local backgrounds. Thus, the results of the linear regression analysis are only applied to weak features and their respective local backgrounds.

The spot deviation of strong features surrounding a weak feature can be used to further refine the estimated position of the weak feature. For example, if the surrounding features have a systematic deviation, this deviation may be applied to the weak feature's position. For strong features, the center of mass of the centroid might not be the best position estimate. The most uniform portion of the blob may be a better position estimate, in order to prevent the feature from being unnecessarily tagged as a non-uniformity outlier. Alternatively, a weighted centroid may be used.

In the above case, the fitting of the grid is constrained to maintain a parallelogram symmetry. This is useful in implementations where systematic linear distance errors are small, which is generally true for linear encoders. There may be other situations where systematic distortions may break the parallel symmetry, for example, distortions arising from imaging optics where the array is imaged slightly out of the image plane. In some cases, the fit may preserve quadrangular symmetry whereas, in other cases, nonlinear fitting procedures may be required.

The array of features can be broken up into a number of smaller regions or zones, and each zone can be fitted to its own local grid. This can serve several purposes. For example, if there are known to be systematic positioning errors in certain regions, then each of those regions may be fit to a small, localized grid. This method may be used for cDNA arrays and whole oligonucleotide deposition programs where sets of spots are deposited by different pins, pens, jets, or nozzles. Some ink-jet nozzles fire at fixed angles relative to other nozzles. In other deposition techniques, features are deposited onto flexible membranes. The membranes can stretch locally causing small regional distortions, making it impossible to adequately fit the whole array of features by a single grid. In this case, the grid can be broken down into a number of smaller grids, each grid with at least a few strong features. This case may better be addressed by a set of localized grids of quadrangular symmetries. When there are systematic errors associated with either pins or an ink-jet nozzle, it is not necessary for these subgrids to be non-overlapping. In fact, these independent grids, or sets of disjoint features, may overlap completely. The values of strong features associated with each independent grid are set to "1," and all other feature values are set to zero, and the grids care then independently fit.

Rejection of Outlier Pixels and Multi-Color Scans

Once feature positions are determined, whether from blob analysis for strong features or from linear regression analysis for weak features, a set of pixels from each feature is then selected for signal extraction. The selected pixels for a feature initially comprise those pixels having pixel intensity values for each signal and, optionally, for ratios of all pairs of signals, that fall within acceptable ranges within a selected region corresponding to the feature. Selection of a region for initial pixel selection for a feature can be made on the basis of geometry, e.g. selecting pixels within an ellipsoid of a size and orientation expected to include signal-bearing pixels, or may alternatively be accomplished through morphological analysis of features using image-processing techniques. Selection of a set of pixels for signal extraction for a feature may be accomplished by removing, or disregarding, outlier pixels from the initial set of pixels within the selected region. Removal of outlier pixels from a feature, in one embodiment of the present invention, occurs through the following process: (1) construction of an initial inlier binary mask in which pixels of the feature have corresponding values of either 1 or 0, and all pixels within the selected region are initialized to have value 1, while all other pixels are initialized to have the value 0; (2) for each signal, identification of any outlier pixels within the selected region having intensity values outside of an acceptable range and setting of the corresponding values for those outlier pixels to 0 in the inlier mask; (3) for each possible pair of signals, identification of any pixels within the selected region for which the ratio of the intensity values for the signals of the pair of signals fall outside of an acceptable range and setting of the corresponding values in the inlier binary mask to 0; and (4) selection of those pixels whose corresponding values in the inlier mask have the value 1 as the signal extraction pixels for the feature.

Figure 28:
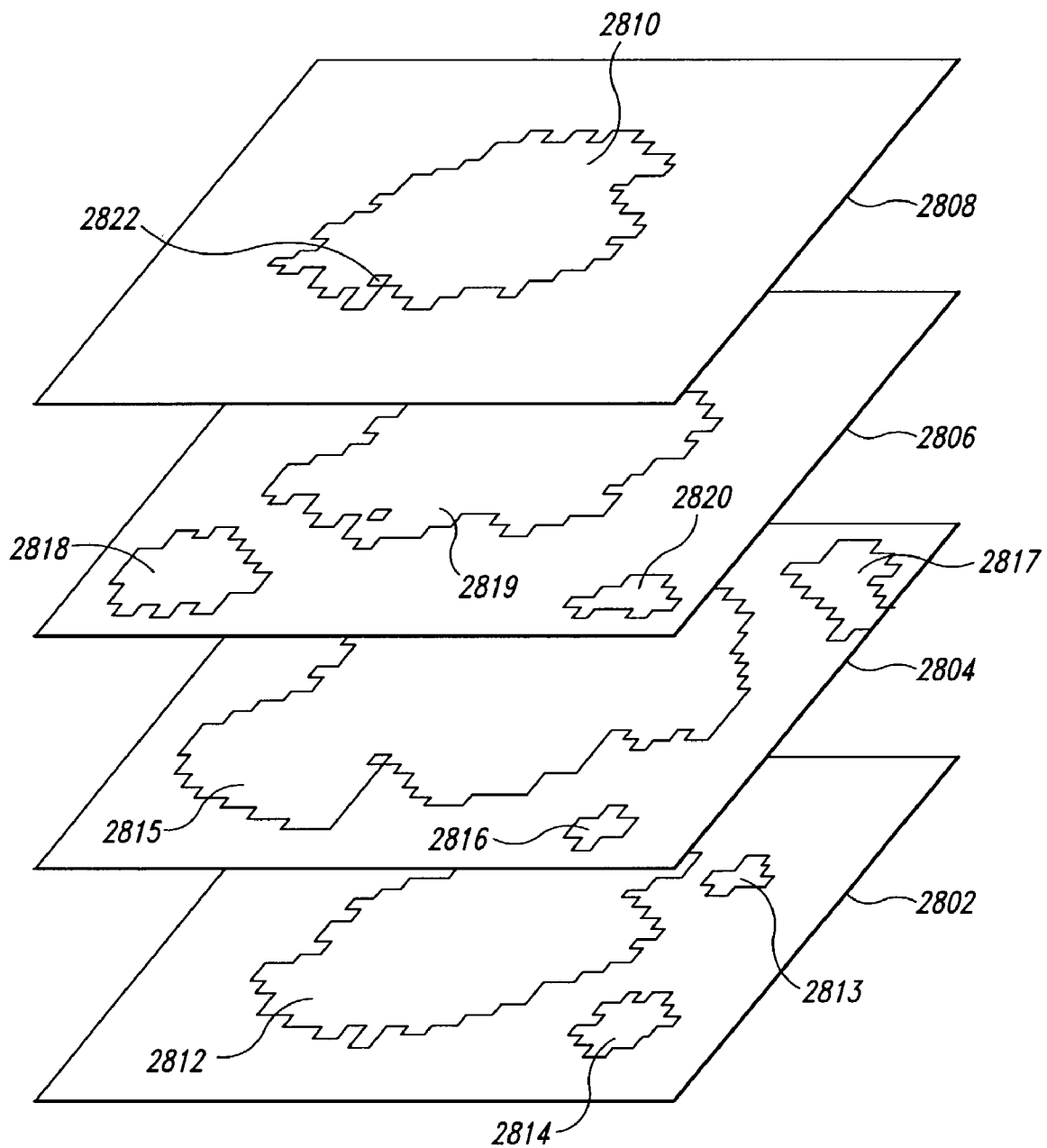
FIG. 28 illustrates a technique for outlier rejection.

FIG. 28 illustrates the above-described technique for outlier rejection. In FIG. 28, plane 2802 represents the green signal intensity values for a region of interest surrounding a feature, plane 2804 represents the red signal intensity values for the same region of interest, plane 2806 represents the ratio of the green to red signal intensity values, and plane 2808 represents the inlier mask corresponding to the region of interest. The process of outlier rejection can be considered as a process of setting the value of a pixel in the inlier mask 2808 to "1," if that pixel falls within acceptable ranges of intensity values in the green signal plane 2802 and red signal plane 2804 as well as within acceptable range of values of green to red signal ratios in the green to red signal ratio plane 2806. Acceptable ranges can be based on the standard deviation of the pixels comprising the feature. For example, the low limit can be set as the average of the feature minus two standard deviations and the high limit can correspondingly be set as the average of the feature plus two standard deviations. In FIG. 28, the pixels having acceptable green signal values occur in the darkened regions 2812–2814, pixels having acceptable red intensity values fall within the regions of the red signal plane 2815–2817, and pixels having acceptable green signal to red signal ratios fall within regions 2818–2820 of the green to red signal ratio plane 2806. Thus, for example, pixel 2822 has the value 1 in the inlier mask 2808 because it occurs within acceptable ranges in the green to red signal ratio plane 2806, in the red signal plane 2804, and in the green signal plane 2802.

An iteration step can be added here. For example, after pixel outlier analysis, all strong features can be again subjected to blob analysis. This is useful for features with small areas of signal that are significant with respect to the threshold, but are, in fact, artifacts. In such cases, a truly weak feature may be labeled strong and the centroid of that feature may be incorrectly positioned or, alternatively, the centroid of a strong feature including an artifact may be incorrectly positioned, or, in other words, pulled from the true grid. Subsequent pixel outlier analysis will remove much of the original high signal outlier pixels of such features that correspond to artifacts. If a second round of blob analysis is performed, a weak feature incorrectly labeled strong may no longer have a large enough blob over threshold to be labeled strong. The feature will then be labeled as weak and its centroid will be positioned via the above linear regression analysis. In the case of strong features with artifacts, a second round on blob analysis will likely better position the corresponding centroids. Instead of performing the second round of blob analysis on all strong features, the analysis can be limited to those strong features having a blob size lower than a set limit, that is, to those features which are "borderline" strong.

Signal Extraction from Features and Propagation of Errors

Figure 29:
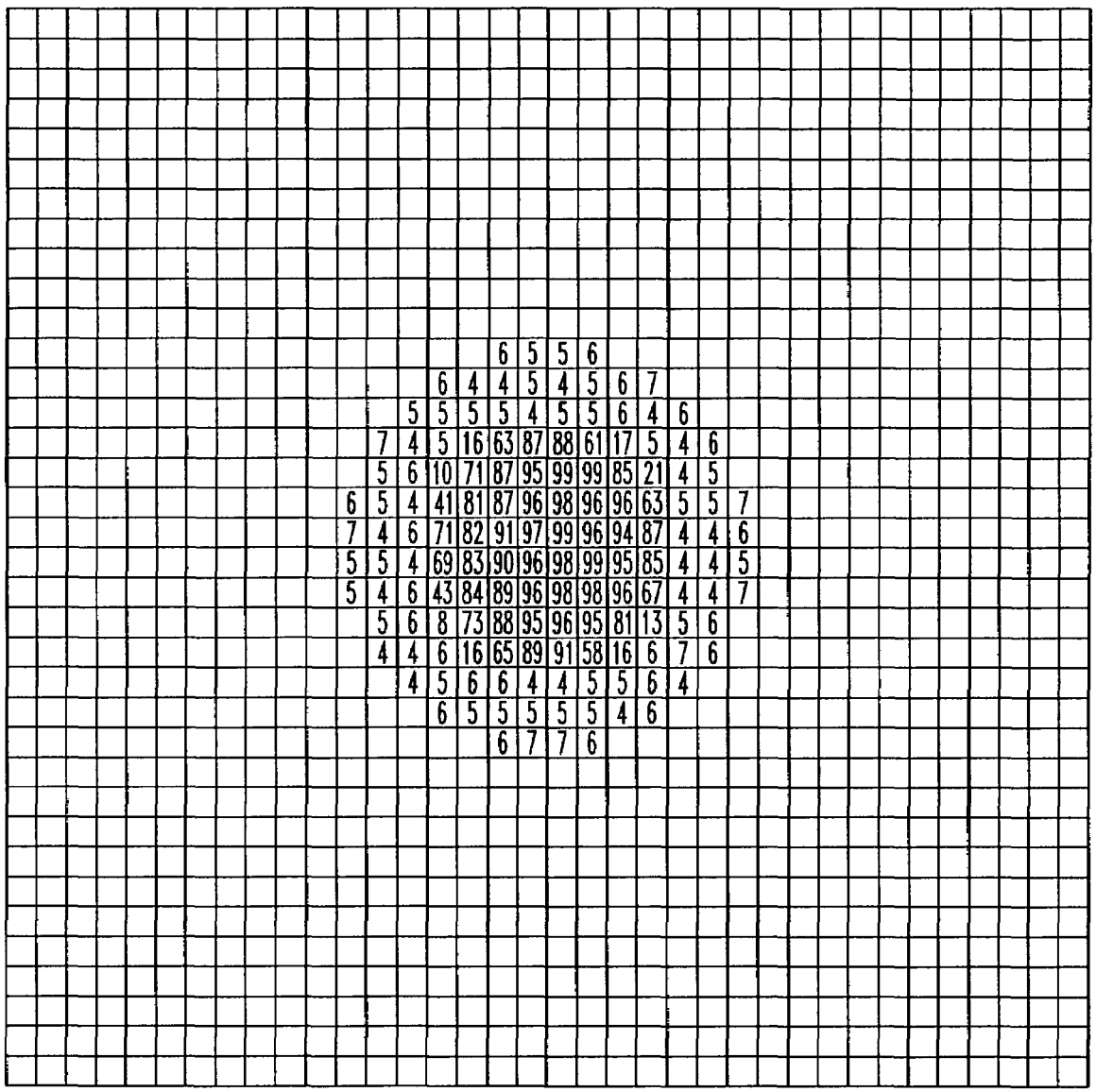
FIG. 29 shows the green signal intensity values for a feature.
Figure 30:
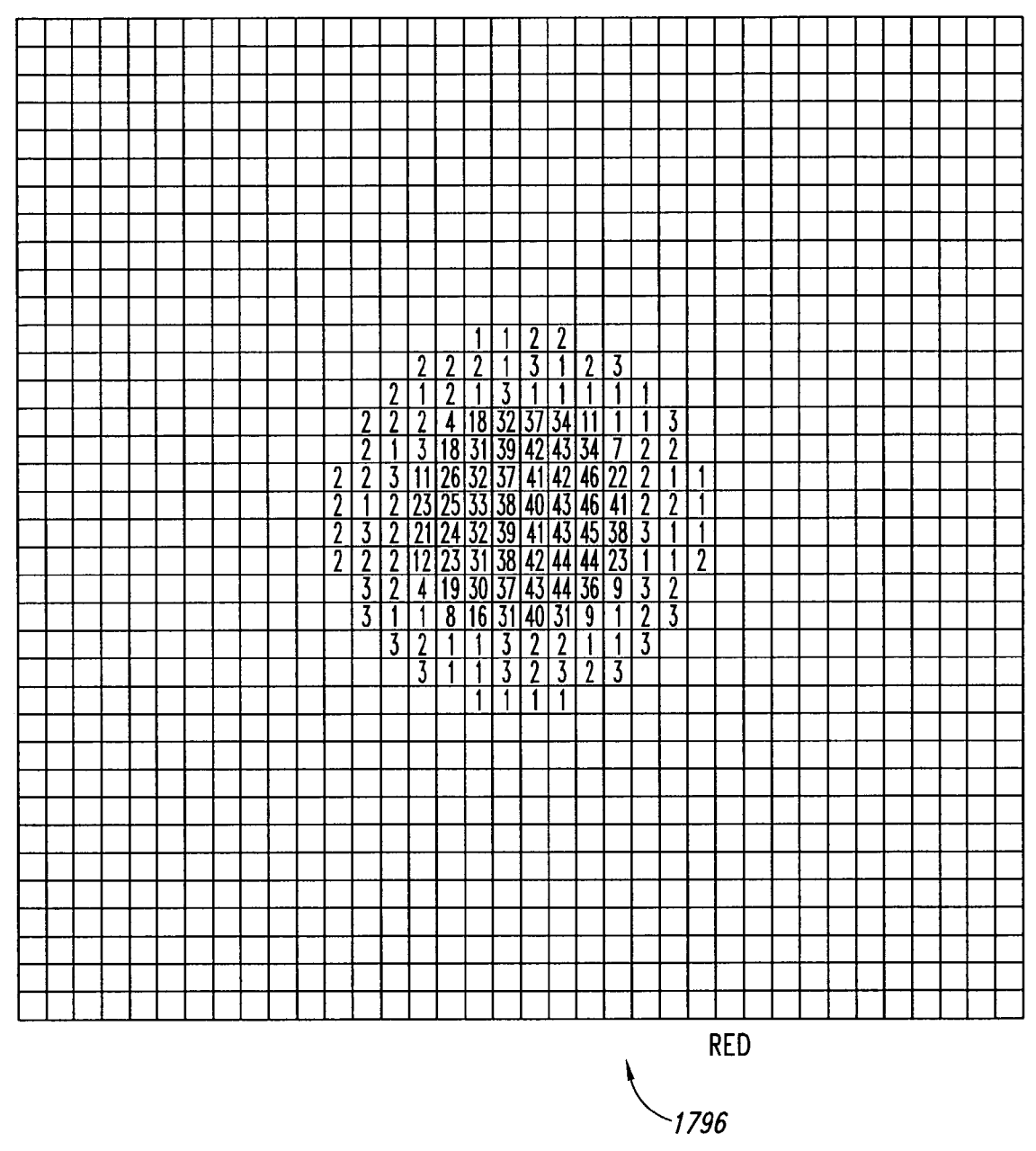

For many types of analysis, it is desirable to extract the ratio of background subtracted and normalized signal intensities from the region of each feature determined according to the technique described in the previous sub-section. In this subsection, a technique for extracting signals, signal ratios, and determining variances is illustrated and described. In this subsection, the green signal intensity values for a feature are shown in FIG. 29 and the red intensity values for the same feature are shown in FIG. 30. The green intensity values range from 5 to 99, and the red intensity values range from 1 to 46. The average value for the green signal intensities for the feature is calculated as follows:

$$\mu_g = \frac{1}{N}\sum_{i=0}^{N-1} g_i$$

where $\mu_g$ is the average green signal, N is the number of pixels within the feature, and $g_i$ is the green signal intensity of the $i^{th}$ pixel. The average red signal intensity value $\mu_r$ is similarly calculated. The variance of the green signal for the feature is calculated as follows:

$$\sigma_g^2 = \frac{1}{N-1}\sum_{i=0}^{N-1}(g_i - \mu_g)^2$$

The variance for the red signal intensities $\sigma_r^2$ is similarly calculated. The covariance of the red and green signal intensities for the feature is calculated as follows:

$$\sigma_{gr}^2 = \frac{1}{N-1}\sum_{i=0}^{N-1}(g_i - \mu_g)(r_i - \mu_r)$$

The estimated variance on the mean $\mu_g$ is calculated as:

$$\sigma_{\mu g}^2 = \frac{\sigma_g^2}{N}$$

and the estimated variance of the mean $\mu_r$ is similarly calculated. Finally, the estimated covariance on the mean is calculated as:

$$\sigma_{\mu gr}^2 = \frac{\sigma_{gr}^2}{N}$$

The values of these parameters for the example features of FIG. 29 and FIG. 30 are provided below:
N=60
$\mu_g$=75.73
$\mu_r$=29.93
$\sigma_g^2$=930.94
$\sigma_r^2$=162.47
$\sigma_{gr}^2$=323.00
$\sigma_{\mu g}^2$=15.51
$\sigma_{\mu r}^2$=5.38
$\sigma_{\mu gr}^2$=2.71

Figure 31:
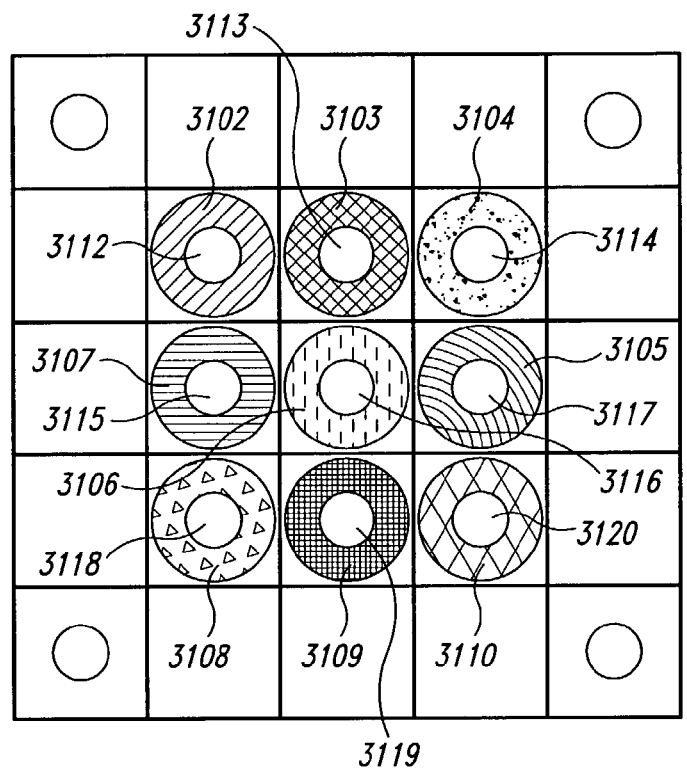
FIG. 31 illustrates a number of local backgrounds.
Figure 32:
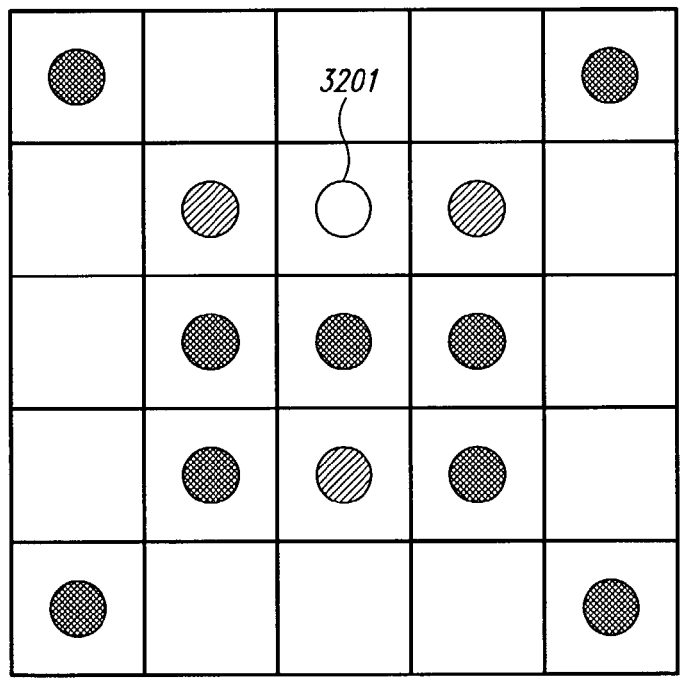
FIG. 32 illustrates a minimum feature.

These parameters represent raw signals and raw signal statistics. Continuing on with further processing, a background level must be subtracted from each feature signal due to differences in background intensities within the various color channels. There are a number of different methods to determine the background intensity for different signals. In a first method, the average background intensity for each signal can be measured and reported by the scanner. In a second method, a population of pixels in a region surrounding or in proximity to a feature, known as a local background, can be averaged to provide a different background measurement for each feature. In a third method, the background for a signal can be computed as the average of a collection of local backgrounds. For example, the nine nearest neighboring local backgrounds or, all the local backgrounds can be pooled together to obtain a background value. In a fourth method, the background can be estimated as the average signal intensity of a minimum feature or minimum local background in the molecular array. Finally, in a fifth method, the background can be calculated as the average of all or a subset of appropriate control features included in the molecular array. The appropriate control features can comprise a negative control designed not to hybridize with any target sample molecules or a deletion control designed to estimate the amount of non-specific hybridization of a corresponding perfect match feature. Arrays can have multiple populations of negative controls. To determine which population to use as a measure of background, the populations can be compared using a two-tailed student's t-test or other non-parametric t-test equivalent. If the populations are the same, the populations can be combined. If they are different, the population with the lowest signal can be used, the population that yields the straightest log-ratio plot can be used, or other independent measures can be used to evaluate the best population to use. Alternative median statistics and robust standard deviation estimators can be substituted for the use of mean and standard deviation in all of the above examples of background calculations and in subsequent discussions of error propagation. FIG. 31 illustrates a number of local backgrounds. In FIG. 31, local backgrounds 3102–3110 surround features 3112–3120. FIG. 32 illustrates a minimum feature. In FIG. 32, feature 3201 has the lowest intensity for a particular signal. Thus, the average pixel intensity values for the signal of feature 3201 are taken as the background for that signal.

Alternative robust statistical metrics can be used in the above pixel outlier, feature extraction, and background calculation algorithms and in subsequent discussions of error propagation. Examples of a robust location metric include the median or the trimmed mean. Examples of robust dispersion metrics are the IQR and MAD metrics discussed above in the threshold determination section. Two of the advantages of using robust metrics, as opposed to the use of average and standard deviation, are that they are far less influenced by outliers and they do not make assumptions of the nature of the underlying distribution of data. It should be noted that non-parametric t-test equivalents can be used in all places were t-test have been specified.

The background averages and variances associated with each local background are notationally represented as $\mu_{bg,g}$, $\mu_{bg,r}$, $\sigma_{\mu bg,g}^2$, $\sigma_{\mu bg,r}^2$. These parameters can be computed similarly to the computation for the averages and variances of the raw signals, described above. However, if the background is estimated from a collection of local backgrounds or a subset of control features, and thus represents an average of averages, or pooled average, then variance of the background measurement may be properly represented as follows. Let $\mu_{BG,g}$ and $\mu_{BG,r}$ represent the average background signal for the green and red features respectively. Let $\sigma_{BG,g}^2$ and $\sigma_{BG,g}^2$ represent the estimated variance on $\mu_{BG,g}$ and $\mu_{BG,r}$ respectively. Method 3, outlined above, is treated below, where the pooled average is:

$$\mu_{BG,g} = \frac{\sum_{i=0}^{L-1}\left(\frac{\mu_{bg,g,i}}{\sigma_{\mu bg,g,i}^2}\right)}{\sum_{i=0}^{L-1}\left(\frac{1}{\sigma_{\mu bg,g,i}^2}\right)}$$

and the variance of the average of averages is calculated as follows:

$$\sigma_{BG,g}^2 = \frac{1}{\sum_{i=0}^{L-1}\left(\frac{1}{1/\sigma_{\mu bg,g,i}}\right)}$$

where L is the number of local backgrounds used in calculating the average, for example, the nine nearest neighboring local backgrounds.

The background-subtracted green signal $\mu_G$ is calculated as follows:

$$\mu_G = \mu_g - \mu_{BG,g}$$

and the background-subtracted red signal $\mu_R$ is similarly calculated. The variance of the background subtracted green signal $\mu_G^2$ is calculated as follows:

$$\sigma_G^2 = \sigma_{\mu g}^2 + \sigma_{BG,g}^2$$

and the variance of $\mu_R$ is similarly calculated. The covariance of the background-subtracted green and red signals $\sigma^2 GR$ is calculated as follows:

$$\sigma_{GR}^2 = \sigma_{\mu gr}^2 + \sigma_{BG,gr}^2$$

To facilitate biological interpretation and downstream analysis of the data, the statistical significance of feature signals needs to be determined. A problem arises if, for example, the red channel signal and green channel signal of the same feature are both indiscernible from their surrounding local background, but the green channel signal is still twice as bright as the red channel signal. The user, in this case, may obtain a false result indicating a two-fold increase in expression by the green channel if the ratios are calculated with data that is not significantly different compared to a blank, where the blank is one of the background options outlined above. This problem may be addressed by performing statistical significance tests on feature data. A two-tailed student's t-test is performed on the population of pixels comprising the feature with the appropriate population comprising the background signal. The population used for the background signal depends on the method chosen for background subtraction. As discussed below, this significance information is used when calculating the log of the ratio of one color channel signal to another color channel signal of the same feature.

As can be seen in the examples feature signal intensities of FIGS. 29 and 30, the average value for one signal intensity for a particular feature may be quite different from the average value for a different signal for the same feature.

For example, the labeling and photon-efficiencies of different dyes, or chromophores, may be different. In FIGS. 29 and 30, $\mu_g$=75.73 and $\mu_r$=29.93. In this case, in order to compare the green and red signals of the features for a molecular array, the green and red signals for all features must be normalized.

Signal response curves may be employed during normalization. A linear normalization curve is assumed in the following discussion, but other types of curves can also be used. In one embodiment of the present invention, using the assumption that, on average, genes are not differentially expressed, the average (or median) log ratio of red to green background-subtracted signals is forced to be zero. When this assumption is not true, the user may select a subset of probes or genes on the array that meet these criteria. In one embodiment of the present invention, a dialog box is displayed that lists all the probes/genes on the array. The user then selects which probes/genes should be used as constants, or, in other words, as housekeeping genes. Housekeeping genes are genes that are known by the experimenter to not change their expression level in both the control and test samples.

Normalization is accomplished by computing a dye normalization factor for each color channel, DNFactor$_G$ and DNFactor$_R$. Thus, using M feature signals:

$$DNFactor_G = 10^{\left(\frac{\sum_{j=1}^{M} \log_{10}(\mu_{G,j})}{M}\right)}$$

Using the dye normalization factors, all the feature signals are then normalized. Let $\mu_{Rn}$ and $\mu_{Gn}$ represent the dye normalized red and green signals.

Thus, $$\mu_{Gn} = DNFactor_G \cdot \mu_G$$

and $$\mu_{Rn} = DNFactor_R \cdot \mu_R$$

Let $\sigma_{Gn}^2$ and $\sigma_{Rn}^2$ represent the variance on $\mu_{Gn}$ and $\mu_{Rn}$ respectively, where, following the standard error propagation equation:

$$\sigma_{Gn}^2 = DNFactor_G^2 \cdot \sigma_G^2$$

$$\sigma_{Gn}^2 = DNFactor_R^2 \cdot \sigma_R^2$$

Let $\sigma_{GRn}^2$ represent the propagated covariance where:

$$\sigma_{GRn}^2 = DNFactor_G \cdot DNFactor_R \cdot \sigma_{GR}^2$$

Finally, let LR represent the $\log_{10}$(red to green ratio) where:

$$LR = \log_{10}\left(\frac{\mu_{Rn}}{\mu_{Gn}}\right)$$

To propagate the error at this step, the standard error propagation equation for x=f(u,v) is used $$\sigma_x^2 \cong \sigma_u^2\left(\frac{\partial x}{\partial u}\right)^2 + \sigma_v^2\left(\frac{\partial x}{\partial v}\right)^2 + 2\sigma_{uv}^2\left(\frac{\partial x}{\partial u}\right)\left(\frac{\partial x}{\partial v}\right)$$

In the current case, letting $\sigma_{LR}^2$ represent the variance of LR, application of the above formula yields:

$$\sigma_{LR}^2 \cong \frac{1}{(\ln 10)^2}\left[\frac{\sigma_{Rn}^2}{\mu_{Rn}^2} + \frac{\sigma_{Gn}^2}{\mu_{Gn}^2} - 2\left(\frac{\sigma_{GRn}^2}{\mu_{Rn} \cdot \mu_{Gn}}\right)\right]$$

It is important at this point to test for significance of the red and green channel data. If both color channel signals for a feature are found to be insignificantly different from the population describing the feature's background, typically at a significance level<0.01, then set the log ratio log(0/0) is set to be log(1) which is defined to be 0. This avoids the erroneous result of a gene expression level artificially high or low based on data that is considered to be essentially the same as some background level. This problem may also be solved by the use of surrogates.

Once signals have been background-corrected and dye-normalized, a ratio is calculated for the (red/green) signal. As discussed above, every signal calculated has an associated error. These errors are propagated to yield a final error value for each log ratio. The use of error bars for the log ratios adds accuracy to the final results, minimizing incorrect results, especially false positives. A false positive may result from, for example, a log ratio value being different from zero, but not significantly different. An alternate method that the feature extraction software uses to minimize incorrect log ratios is a surrogates-based method. When a signal is very low, it may not be significantly different from the background signal. That is, even though a background-corrected signal is greater than zero, it may be below the lowest signal that can be accurately detected for that array. Noise from scanner optics and non-specific signal will increase the signal level that is needed for a trustworthy value. For signal values that do not meet a criterion of significance, the surrogates-based method uses a surrogate value.

One method for choosing a significance criterion, described in this implementation, is to require that the signal is significant versus its background (e.g. p-value<0.01 with a Student's t-test) and that the background-corrected signal is positive. And, and significant (e.g. p-value<0.01 with a Student's t-test) versus its background. The background utilized will be different depending upon which method the user has chosen from the multiple background methods available in the feature extraction software. In addition, if the feature has a deletion control (i.e. it is a perfect-match type of probe), the feature also needs to be positive and significant (e.g. p-value<0.01 with a Student's t-test) versus its matched deletion control. A more stringent implementation also requires that the background-corrected signal of a feature be greater than the value of the surrogate.

The method of choosing a surrogate value described in this implementation is to utilize the standard deviation ("SD") of the background signal, calculated, as described in above sections, as a minimum threshold of significance.

An example implementation uses dye-normalized signals. In such an example, surrogates need to be corrected by the dye-normalization factors. Thus, the dye-normalization constant used for the green channel is multiplied by the green background SD and, similarly, the dye-normalization constant used for the red channel is multiplied by the red background SD.

There are also other various scenarios for error propagation. For example, if neither, or only one, channel's signal uses a surrogate, then error propagation and calculation of the p-value of the log ratio proceeds as normal. If both channels need surrogates, the log ratio is set to 0 (i.e. ratio=1) and the p-value is set to 1 (i.e. not significant from zero).

A more stringent implementation multiplies the background signal SD by 2.6. This value is approximately equal to a value below which 99% of the background signals can be expected. According to the more stringent implementation: (1) features must be positive and significantly above background and, if there is a deletion control associated with a feature, the feature must be positive and significantly above the deletion control in order for the feature's dye-normalized signals to be included in the ratio calculation, and, optionally, the signal must be greater than the surrogate that would otherwise be used; (2) for the corner cases where one signal does not pass the above tests, use 2.6*dye-normalized-background SD instead of the feature's dye normalized signal; (3) when neither channel meets the criteria listed in (1), above, the ratio is set tol; and (4) all log ratios are set to fall between −2 and 2.

There are other methods for choosing threshold signal levels for surrogates. For instance, a constant can be utilized for all arrays. However, the above method is preferred, since the above method dynamically reflects the background noise for the given array.

This use of surrogates has several advantages over not using surrogates. First, a ratio calculated with a very low signal in one channel and a higher signal in the other channel, yields an extremely high or low ratio. The accuracy of such a ratio is very low, and using such ratios to designate a gene as being differentially expressed often leads to high rates of false positive calls. Use of surrogates buffers calculated ratios, leading to ratio values more reflective of the differential concentrations of target molecules. Secondly, at times background-corrected signals of features are less than zero and thus, a log ratio cannot be calculated. By using surrogates, all features will have log ratios calculated.

Errors may be calculated two ways. First, the pixel-level error may be propagated through all calculations, starting with raw signals, and continuing through background and/or deletion control subtraction, dye normalization, and log-ratio calculation. Standard error propagation techniques may be employed. The result of this error propagation technique is a log ratio and a log ratio error. The p-value calculation is performed using the equations below for the UEM. In this case, xdev is calculated from the log ratio and the error on the log ratio and plugged into the p-value equation below.

The second way to calculate errors for the log ratio is to follow the universal error method ("UEM"). The UEM determines the standard error of the log ratio and p-value as follows:

$$xdev = (r-g)/\sqrt{sa_r^2 + sa_g^2 + sm_r^2 r^2 + sm_g^2 g^2}$$

where r is the red-signal intensity,
g is the green-signal intensity,
$sa_r$ is the additive error for the red signal,
$sm_r$ is the multiplicative error for the red signal,
$sa_g$ is the additive error for the green signal, and
$sm_g$ is the multiplicative error for the green signal.

$$stderror(\log(ratio)) = \log(ratio)/xdev$$

where stderror( ) is the standard error.

$$p\text{-value} = erfc(|xdev|/\sqrt{2})$$

where erfc is the complementary error function.

The multiplicative error can be calculated empirically by performing self vs. self experiments and examining the variability of the log ratio. The additive error can be calculated by this same empirical method, or as a function of the propagated error, or set to zero. The user may choose to use only the propagated error or to use a hybrid model. One implementation of this hybrid model uses the most conservative estimate of the two models (i.e., the model with the largest p-value). Incorporating the UEM is important since the propagated error underestimates the errors at the high signal range. The propagated error, as well as the additive component of the UEM, is a good representation of the instrumentation noise and error stemming from feature non-uniformity from the writing and/or hybridization processes. However, the propagated or the additive error cannot capture other sources of noise, such as biological and chemical variability, including variability arising during labeling. These sources of variability are captured by the multiplicative component of the UEM.

Implementation

In this subsection, a series of flow-control diagrams are employed to describe the implementation of routines for establishing the orientation of a rectilinear grid for indexing features of a molecular array, determining the pixel-based coordinates of the corner features of a molecular array, establishing an initial mapping between pixel coordinates and the indexing grid, and determining positions of the features using the initial mapping. The positions of weak features can then be refined according to the linear regression analysis method described above. The linear regression analysis, subsequent rejection of outlier pixels, and signal extraction from features along with propagation of errors can be straightforwardly implemented according to the mathematical descriptions provided in previous subsections.

Figure 33:
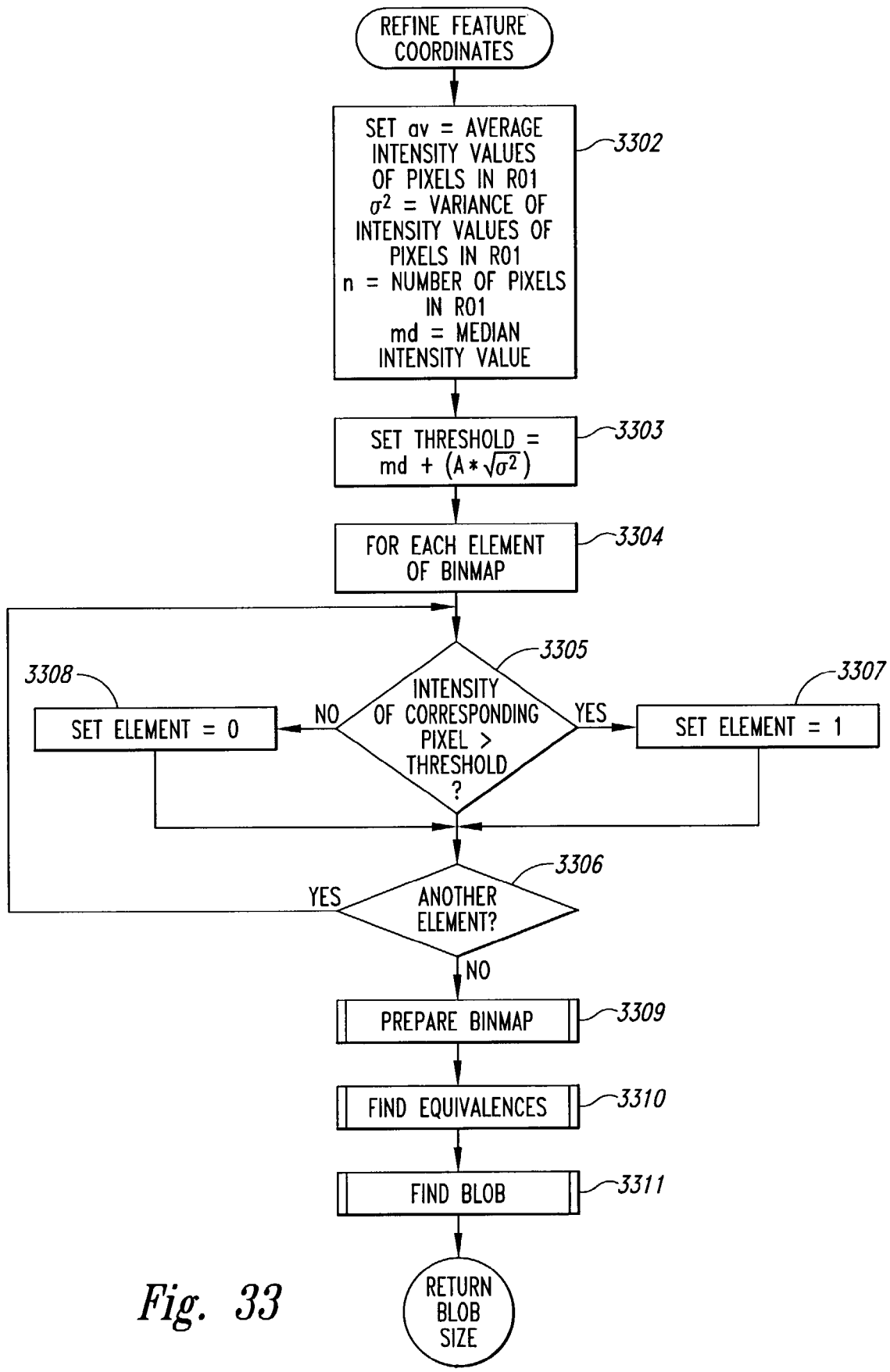
FIG. 33 is a flow-control diagram for the routine "refine feature coordinates."

FIGS. 33–38 provide a series of flow-control diagrams that describe the method of refining feature coordinates by blob analysis, described above with reference to FIGS. 16–20. FIG. 33 is flow-control diagram for the routine "refine feature coordinates." This routine is the top-level routine for implementing refinement of feature coordinates using blob analysis, as discussed above with reference to FIGS. 16–20. In step 3302, the pixels in a scanned image of a molecular array within a region of interest surrounding initial coordinates for the center of a feature are processed to determine the average intensity values of pixels in the region of interest, the variance of the intensity values of pixels in the region of interest, the medium intensity value in the region of interest, and, as a by-product, the number of pixels in the region of interest. The latter quantity may be constant, or may vary slightly depending on the position of the feature within the molecular array and the orientation of an indexing grid determined for the molecular array. In step 3303, a threshold value is set using an above-described formula. In the for-loop comprising steps 3304–3308, a map "binmap" with elements corresponding to pixels of the scanned image of the molecular array is initialized by setting each element of the binmap equal to 1, in step 3307, if the intensity of the pixel corresponding to the binmap element is greater than the threshold value calculated in step 3303, and setting the element value to 0, in step 3308, if the intensity of the corresponding pixel value in the scanned image of the molecular array is less than or equal to the threshold value, as determine in step 3305. Next, in step 3309, the binary map "binmap" is prepared for blob analysis via a call to the routine "prepare binmap," following execution of which the routine "find equivalences" is called in step 3310 to identify all blobs within the region of interest, and, finally, in step 3311, the routine "find blob" is called to identify a sufficiently large, closest blob to the unrefined center position of the feature, refine the feature coordinates according to the centroid of this blob, and return the size, in pixels, of the blob.

Figure 34:
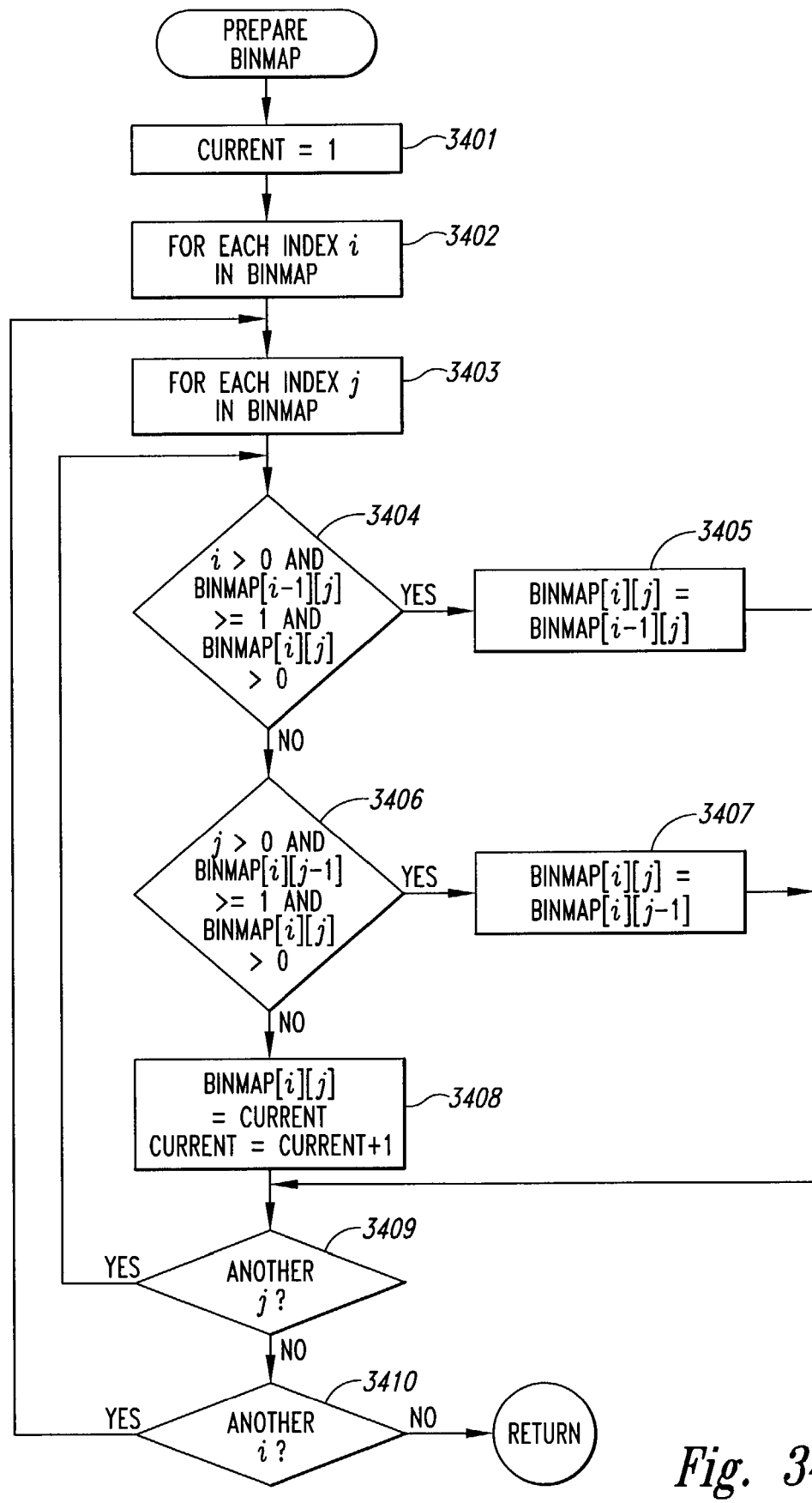
FIG. 34 is a flow-control diagram of the routine "prepare binap."

FIG. 34 is a flow-control diagram of the routine "prepare binmap." This routine analyzes the map "binmap," initialized in steps 3304–3308 of FIG. 33, in order to set the values of elements of binmap initially having the value "1" to a successive set of blob numbers, where each initial blob comprises a set of contiguous pixels corresponding to binmap elements having the value "1." In other words, all elements of binmap initially having the value "1" are assigned new values that represent partitioning of corresponding pixels into groups of contiguous pixels. The variable "current" is set to 1, in step 3401, and is used as the next blob value to be assigned to a newly found group of contiguous pixels having intensities greater than the threshold value. The remaining steps 3403–3410 comprise two nested for-loops in which the variables "i" and "j" are together assigned all possible index-pair values "(i,j)" for every element in binmap. Thus, starting with step 3404, each element in binmap is considered separately. If the element is not the first element in a row, and the previous element in the same row has already been assigned a blob number, then, in step 3405, the currently considered element is set to the blob number of the previous, adjoining element in the row. If, as detected in step 3406, the element is not the first element in a column, and the adjacent element preceding the element in the same column has already been assigned a blob number, then the currently considered element is assigned that blob number in step 3407. Otherwise, in step 3408, the currently considered element is assigned the next blob number, and the variable "current" is incremented. At the conclusion of execution of the routine "prepare bimnap," binmap is partially partitioned into blobs, or equivalence classes, based on physical contiguity of high-intensity pixels within the scanned image of the molecular array.

Figure 35:
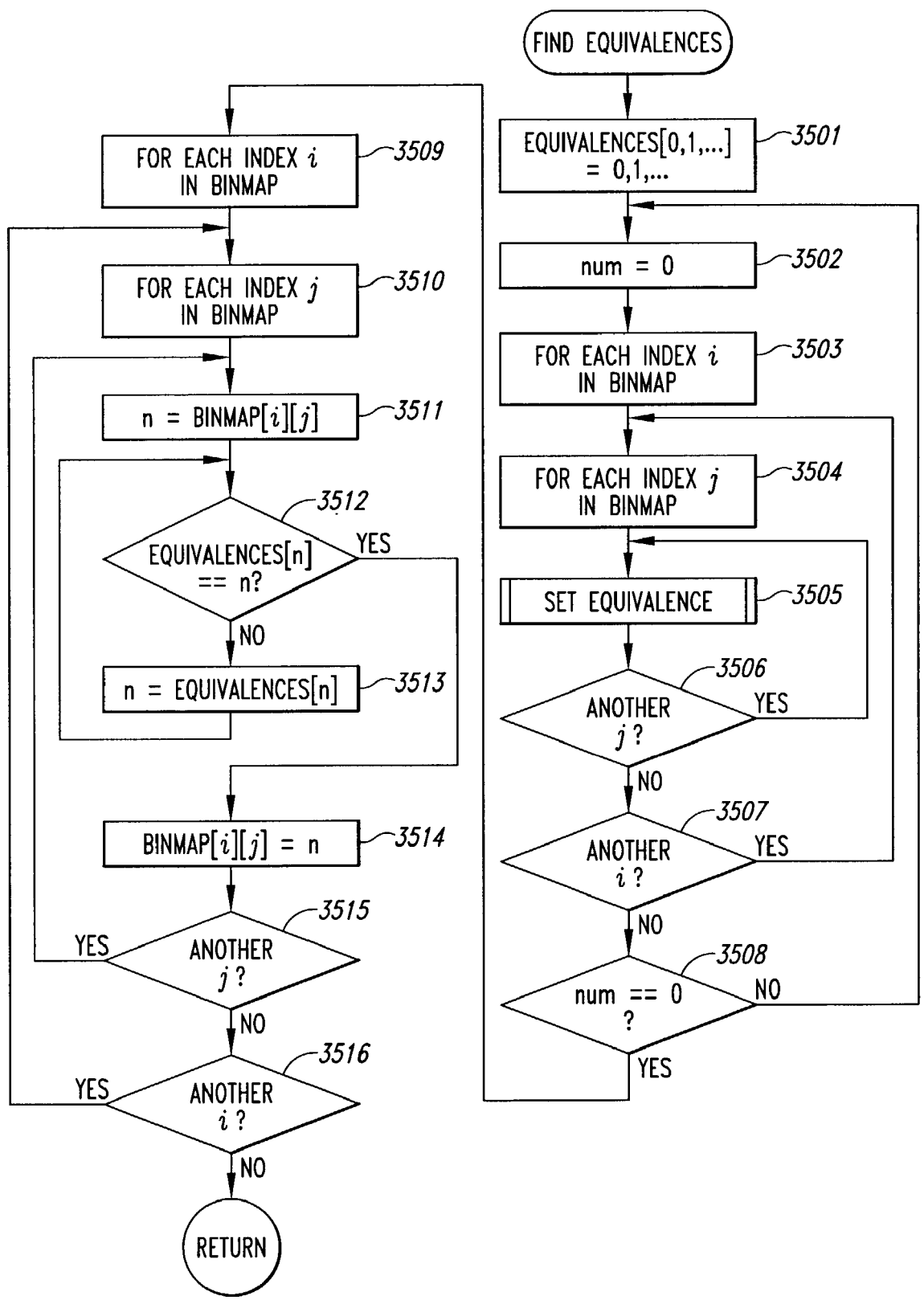
FIG. 35 is a flow-control diagram for the routine "find equivalences."

FIG. 35 illustrates the routine "find equivalences." This routine transforms the partially partitioned binmap into a fully partitioned binmap. Essentially, the routine "find equivalences" identifies pairs of contiguous blobs and coalesces them into a single blob having a blob number equal to the lowest of the blob numbers of the two blobs of the pair. Contiguous blobs may arise for irregularly shaped blobs having, for example, arms separated by elements of 0 value within the map "binmap."

Figure 36:
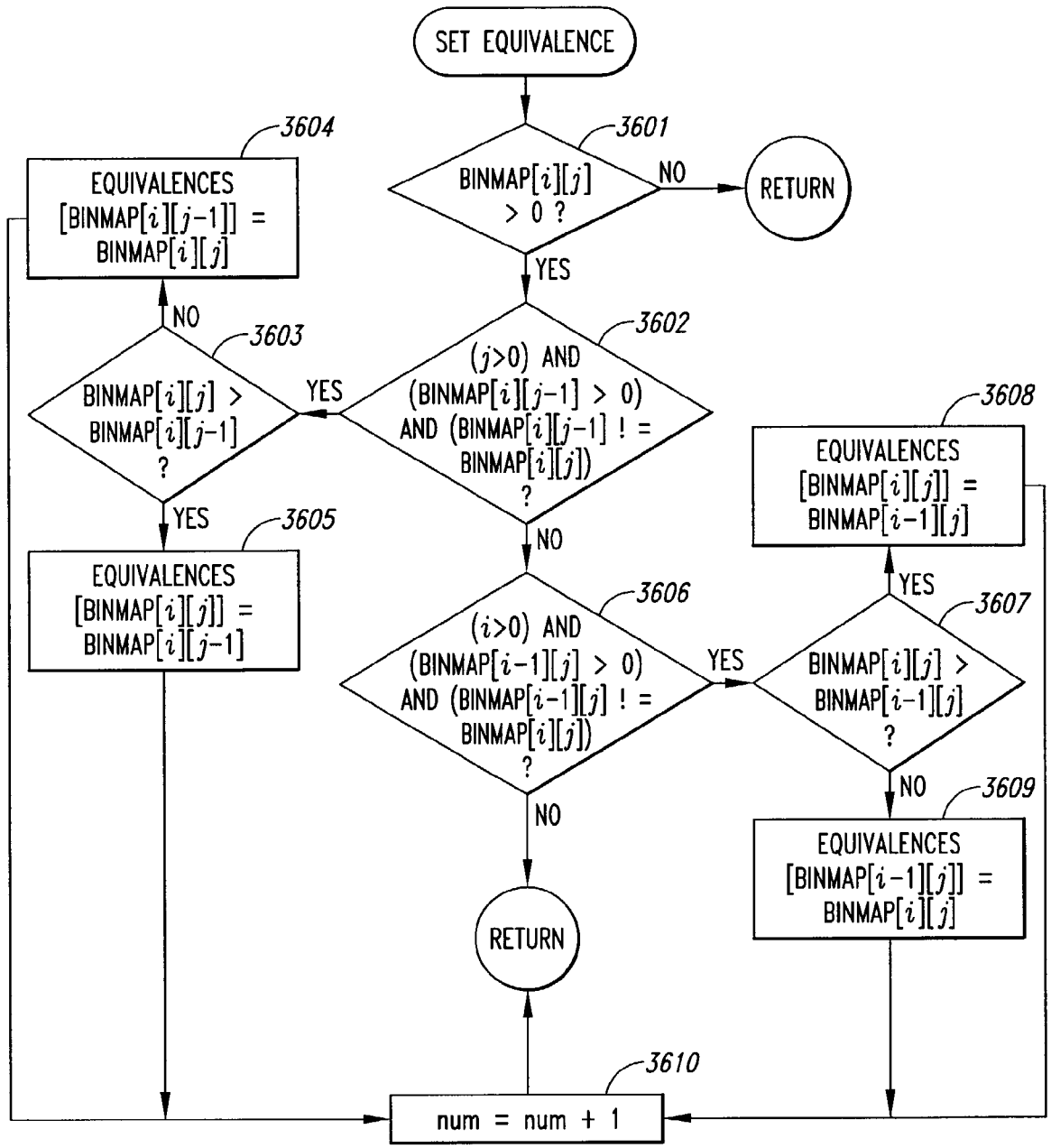
FIG. 36 is a flow-control diagram for the routine "set equivalence."

In step 3501, the routine "find equivalences" initializes the array "equivalences" to contain monotonically increasing values starting with 0. Thus, equivalences[0] contains the value "0," equivalences[1] contains the value "1," etc. The array "equivalences" is indexed by blob numbers, and contains for each blob number any lower-numbered blob number identified by the routine "find equivalences" as being equivalent to the blob. In step 3502, the routine "find equivalences" sets the variable "num" to the value "0." If, following execution of the for-loop comprising steps 3503–3507, the variable "num" still has the value "0," as detected in step 3508, then all pairs of equivalent blobs have been identified and resolved. The for-loop comprising steps 3503–3507 sets the indices "i" and "j" to all possible index pairs "(i,j)" for elements in binmap, and the routine "set equivalence," to be described below with reference to FIG. 36, is called in step 3505 for each binmap element. Once all the equivalences have been found, then, in the nested for-loops comprising steps 3509–3516, binmap elements are reassigned, where necessary, to their final partition value. In step 3511, the variable "n" is assigned to be the current value of a currently considered element of the binmap. Then, in steps 3512–3513, n is iteratively reassigned to the value stored in the array "equivalence" at index n until n equals the value stored in the array "equivalences" at index n, as detected in step 3512. Finally, in step 3514, the binmap element is assigned the value n.

FIG. 36 is a flow-control diagram for the routine "set equivalence," called in step 3505 of FIG. 35. This routine comprises a complex Boolean expression that detects whether a binmap element is adjacent either to a previous element in its row or a previous element in its column, and, if so, sets an equivalence relationship in the array "equivalences" to reflect the fact that the blobs to which the two considered binmap elements belong are equivalent. If an equivalence is detected, then the variable "num" is incremented, in step 3610, in order to cause an additional iteration of the nested for-loops comprising steps 3503–3507 of FIG. 35. Specifically, the routine "set equivalence" first determines whether the value of the currently considered binmap element is greater than 0 in step 3601. If so, then, in step 3602, the routine "set equivalence" determines whether a previous binmap element in the same column as the currently considered element has a different non-zero value than the currently considered element and, if so, sets the appropriate element in the array "equivalences" to reflect the equivalence between the two blobs that contain the two elements in steps 3603–3605. Otherwise, in step 3606, the routine "set equivalence" determines whether a previous, adjacent binmap element in the same row as the currently considered binmap element has a different non-zero value than the currently considered bimnap element and, if so, sets an element of the array "equivalences" to reflect the equivalence of the two blobs to which the two elements belong in steps 3607–3609.

Figure 37:
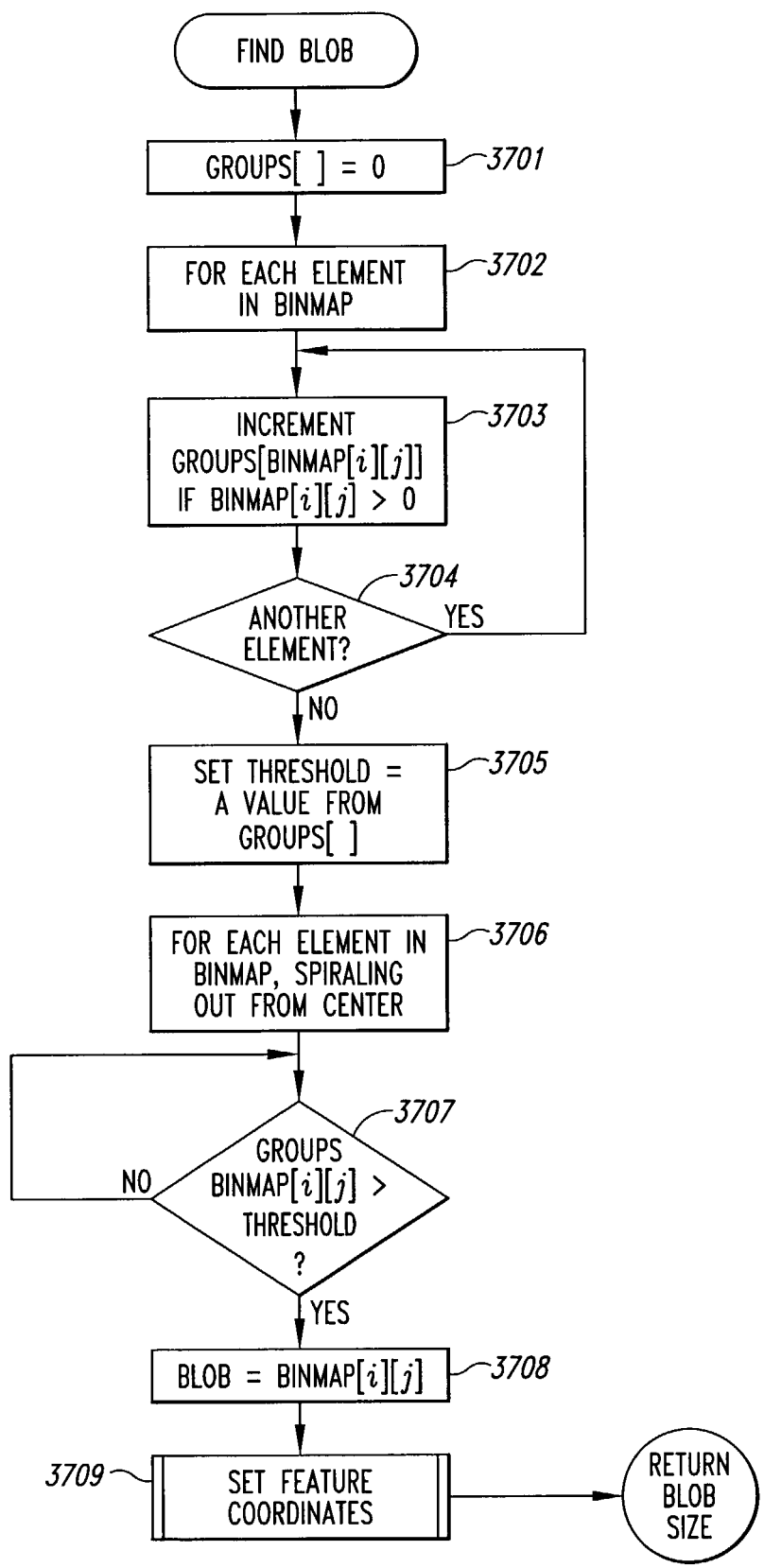
FIG. 37 is a flow-control diagram for the routine "find blob."
Figure 38:
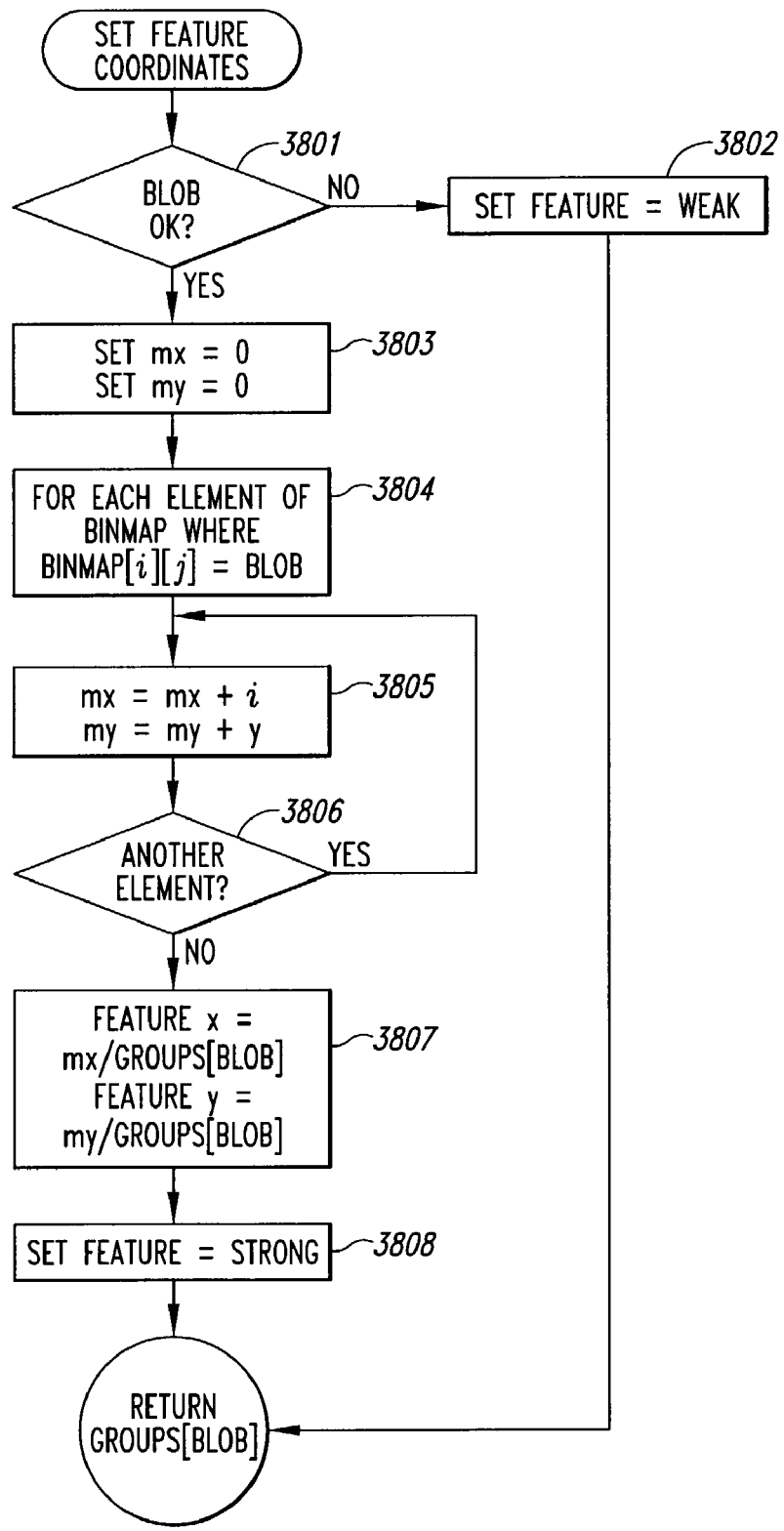
FIG. 38 is a flow-control diagram for the routine "set feature coordinates."

FIG. 37 is a flow-control diagram for the routine "find blob." The routine "find blob" finds the closest blob to the unrefined coordinates of the center of the feature that is greater than a threshold size, and then refines the feature coordinates to correspond to the coordinates of the centroid of the blob by calling the routine "set feature coordinates" in step 3709. First, the routine "find blob" counts the number of pixels, or binmap elements, in each blob and stores the counts in the array "groups" in steps 3701–3704. Then, the routine "find blob" selects a threshold value from one of the values stored in the array "groups" in step 3705. The selection of the threshold value may be based on any number of different criteria, as discussed above. Then, in a for-loop comprising steps 3706–3707, the routine "find blob" selects each element from binmap, starting with the element closest to the center of the feature, and proceeds outward through the region of interest in a spiral, determining in step 3707 whether the next element in the spiral has a value that exceeds the threshold calculated in step 3705. The first binmap element in the spiral that exceeds the threshold breaks the for-loop of steps 3706–3707, resulting in the variable "blob" being assigned to the value of the first binmap element that breaks the for-loop in step 3708. Thus, the variable "blob" is assigned the number of the blob closest to the unrefined center position of the feature having greater than a threshold size.

The routine "set feature coordinates," called by the routine "find blob" in step 3709, determines the centroid of the blob determined by the routine "find blob" and sets the coordinates of the center of the feature to the centroid of the blob. In step 3801, the routine "set feature coordinates" determines whether the blob found by the calling routine "find blob" is acceptable for determining a refined position for the center of the feature. As discussed above, this determination depends on the size of the blob and distance of the blob from the unrefined coordinates of the center of the feature. The routine "set feature coordinates" makes the determination in step 3801 and, if the blob is not acceptable, sets an indication to indicate that the feature is weak in step 3802 and then returns. Otherwise, in steps 3803–3806, the routine "set feature coordinates" accumulates the x and y coordinates of each element of the blob in the variables "mx" and "my" and then, in step 3807, calculates the refined coordinates of the center of the feature as the coordinates of the centroid of the blob. In step 3808, the routine "set feature coordinates" sets an indication that the feature is strong, and then returns. In either the case that the strong or weak feature, the return value passed back by the routine "set feature coordinates" is the number of pixels or binmap element in the blob. The value is passed back through the routine "find blob" to the routine "refine feature coordinates," from which it is passed back to the code calling the routine "find feature coordinates."

Figure 39:
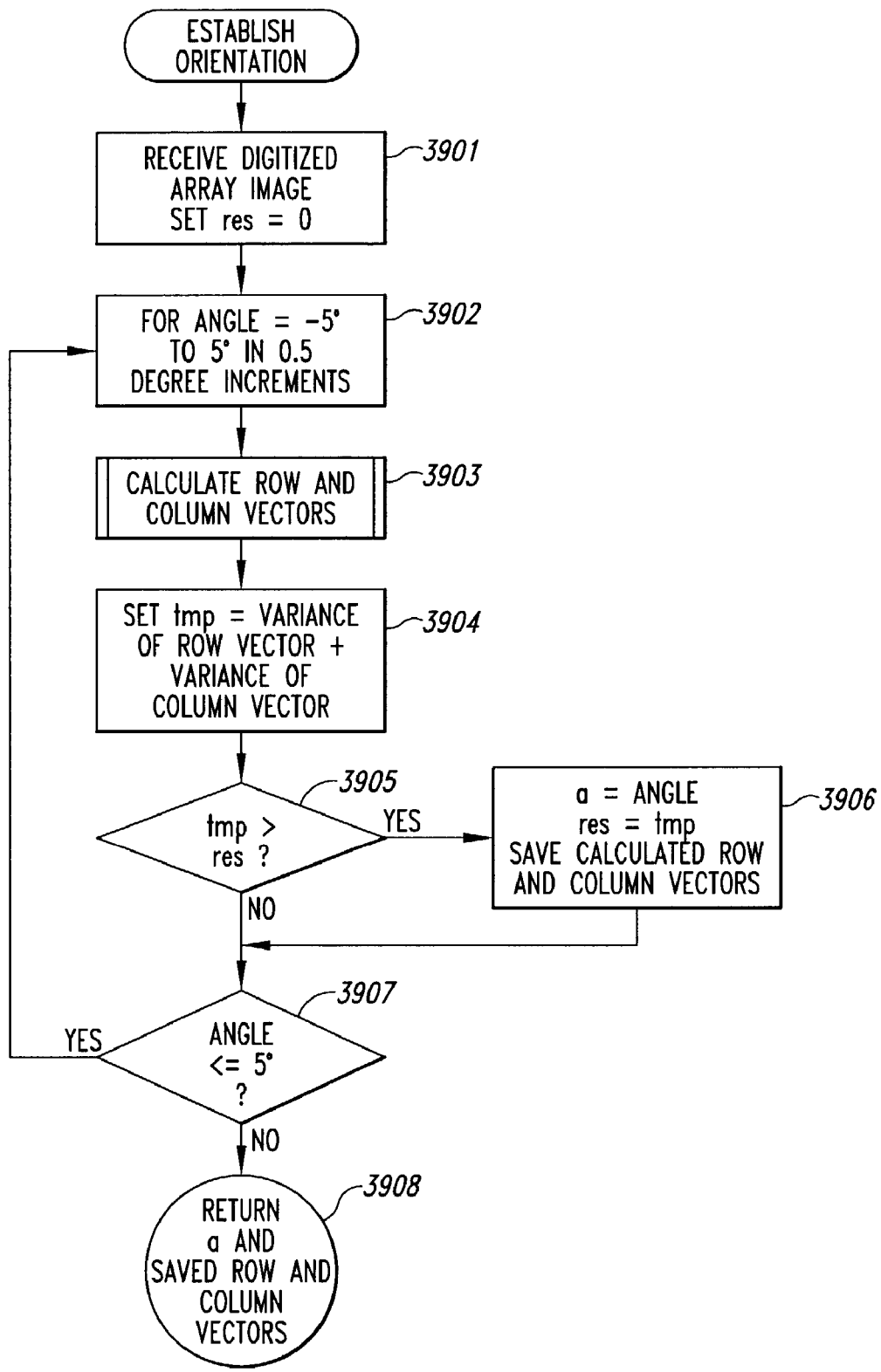
FIG. 39 is the flow-control diagram of the routine "establish orientation" that determines a correct orientation for an initial indexing grid, as discussed above with reference to 4–13.

FIG. 39 is the flow-control diagram of the routine "establish orientation" that determines a correct orientation for an initial indexing grid, as discussed above with reference to FIGS. 4–13. In step 3901, the routine "establish orientation" receives a digitized molecular array scanned image and sets the variable "res" to 0. In the for-loop comprising 3902–3907, the routine "establish orientation" calculates row and column vectors, in step 3903, for each angular orientation between −5 degrees and 5 degrees, and for each angular orientation, sets the variable "tmp" to the sum of the variances of the row and column vectors in step 3904. If the value of temp is greater than the value of res, as detected by the routine "establish orientation" is step 3905, then, in step 3906, res is assigned to the value of tmp and the variable "a" is assigned to be the current angle. In step 3908, the routine "establish orientation" returns the angle "a" as well as the saved row and column vectors saved in step 3906.

Figure 40:
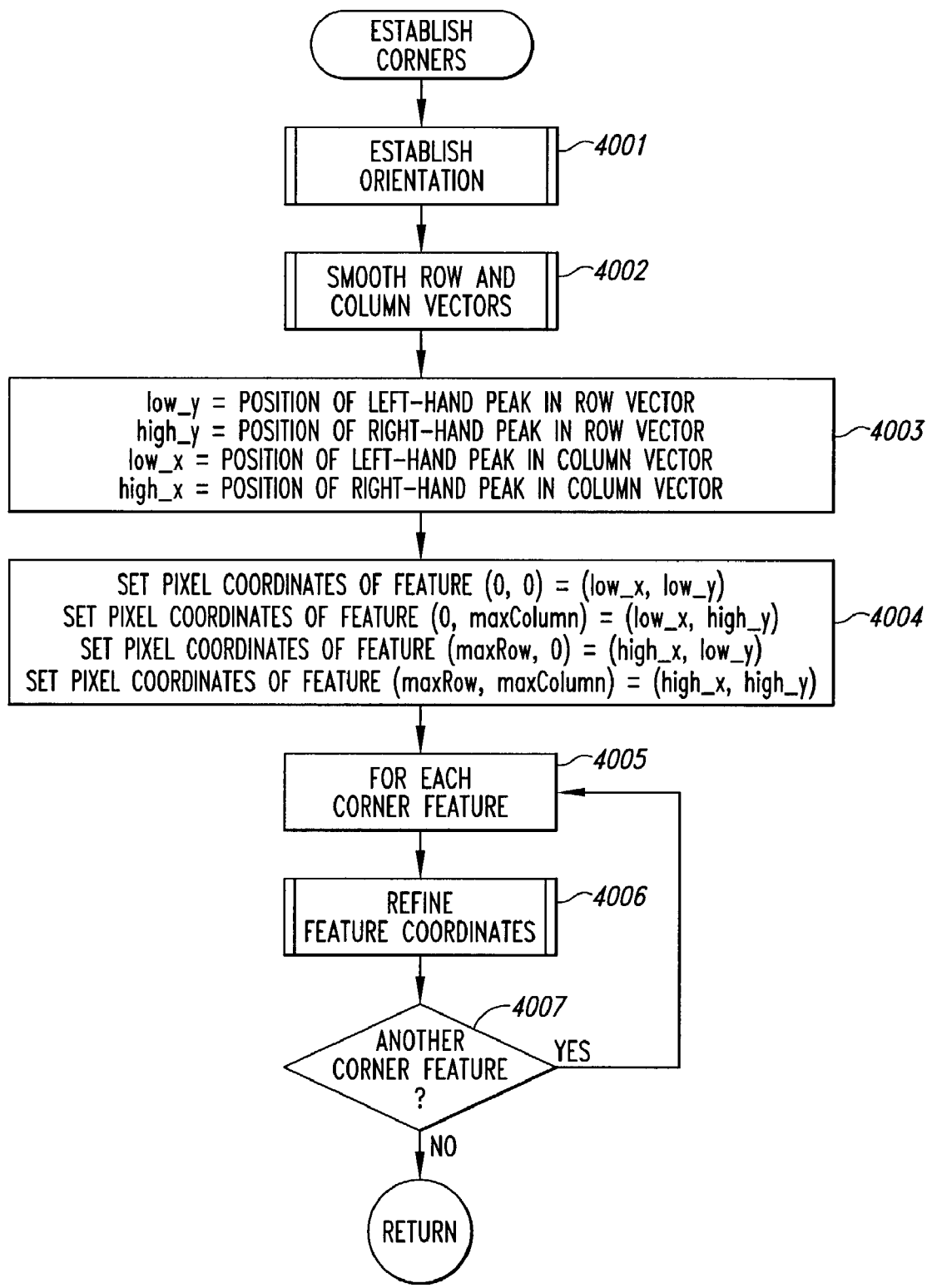
FIG. 40 is a flow-control diagram for the routine "establish corners."

FIG. 40 is a flow-control diagram for the routine "establish corners." This routine determines the positions of corner features as discussed above with reference to FIGS. 14 and 15. First, in step 4001, the routine "establish corner" calls the routine "establish orientation" to set an overall orientation for a rectilinear indexing grid. Next, in step 4002, the routine "establish corners" smoothes the row and column vectors returned by the routine "establish orientation" according to the method described above with reference to FIGS. 6A–B through FIG. 9. In step 4003, the routine "establish corners" sets the variables "low_y," "high_y," "low_x," and "high_x" to the positions of the left and right-hand peaks in the row vector and the positions of the left and right-hand peaks in the column vector, respectively. In step 4004, the routine "establish corners" sets initial pixel-based coordinates for the center of each feature according to the four variables whose values are set in the above step 4003. Finally, in the for-loop comprising steps 4005–4007, the routine "establish corners" calls the routine "refine feature coordinates" for each corner feature to refine the positions of each of the corner features. If four corners are found, the best three out of four corners may be used to establish the grid. If less than 3 corners are found, the user may be prompted to input positions of any three corners.

Figure 41:
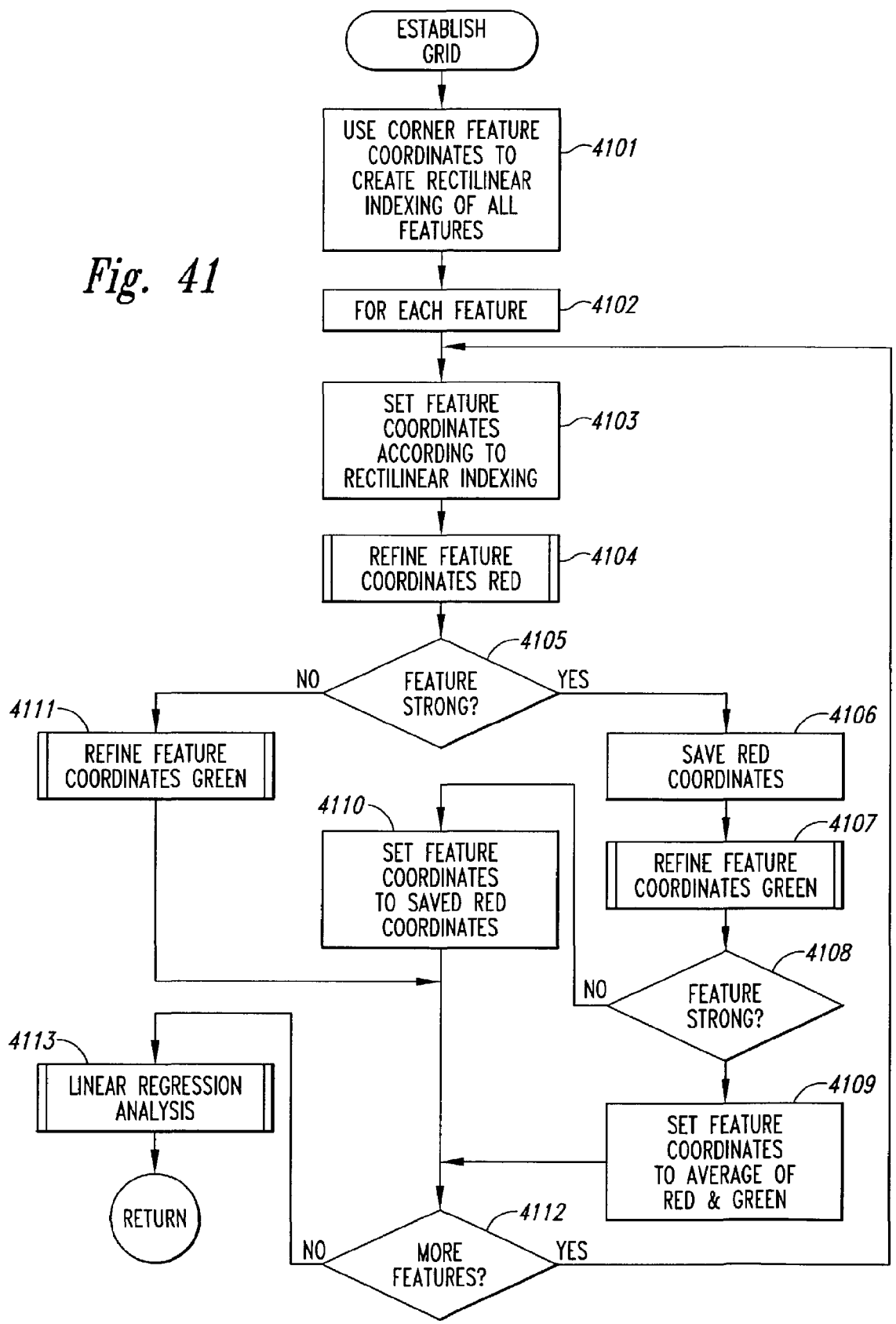
FIG. 41 is a flow-control diagram for the routine "establish grid."

FIG. 41 is a flow-control diagram for the routine "establish grid." This routine establishes an initial rectilinear coordinate system, or indexing system, for a scanned molecular array based on the defined positions of feature coordinates, next determines the positions of all additional strong features, and then, in step 4113, calls a linear regression analysis routine that carries out linear regression as discussed above with reference to FIGS. 21–27 B. First, in step 4101, the routine "establish grid" uses the refined positions of the corner features, returned by the routine "establish corners," to create a rectilinear indexing grid for all features. This indexing grid can be straightforwardly calculated from the orientation angle established by the routine "establish orientation" and by dividing the dimensions of the scanned image of the molecular array, established by the initial positions of the corner features, into equal-sized increments according to the number of features along each dimensional axis. Steps 4102–4112 together comprise a for-loop in which two different sets of data, or signals, are used to determine whether each feature, other than the corner features, is a strong feature for which coordinates can be used as determined, or whether the feature is a weak feature, for which coordinates must be determined via the linear regression analysis carried out in step 4113. In step 4103, the currently considered features initial coordinates are set according to the rectilinear indexing determined in step 4101. Then, the routine "refine feature coordinates" is called in step 4104 with respect to one of two data signals, assumed in the present case to be the red signal. If, as detected by the routine "establish grid" in step 4105, the currently considered feature is strong with respect to the red signal, then, in step 4106, the refined coordinates based on the red signal are saved, and the coordinates of the feature are refined via a call to the routine "refine feature coordinates" in step 4107 with respect to the green signal. If the refinement based on the green signal results in the feature being classified as strong, as detected by the routine "establish grid" in step 4108, then the refined coordinates of the feature are set to the average of the refined coordinates based on the green signal and the saved red coordinates in step 4109. Otherwise, the refined coordinates for the feature are set to the saved coordinates based on the red signal in step 4110. If the feature is not classified strong with respect to refinement related to the red coordinates, then, in step 4111, the routine "refine feature coordinates" is called with respect to the green signal. Finally, following completion of the for-loop comprising steps 4102–4112, a linear regression analysis is conducted, in step 4113, according to the mathematical methodology described above with reference to FIGS. 21–27B.

Although the present invention has been described in terms of a particular embodiment, it is not intended that the invention be limited to this embodiment. Modifications within the spirit of the invention will be apparent to those skilled in the art. For example, an almost limitless number of implementations of the feature extraction method of the present invention are possible using different programming languages, operating systems, programming styles and techniques, and different scanning devices and scanning device interfaces. When more than two different types of data signals are available, the method of the present invention can be easily extended to incorporate the additional data signals, as indicated in the above discussion. The feature extraction methodology outlined above can be employed for many different types of molecular arrays with many different sizes and styles of features placed on the surface of the molecular array in many different regular patterns. The feature extraction method outlined above is applicable to an almost limitless number of different types of molecular arrays with regard to the molecular components of the features and with regard to molecules hybridized or bound to those components during experimentation. Depending on the type of scanning device used for analyzing a molecular array, additional steps and techniques may be added to the above-described feature extraction method in order to account for variations in interfaces, hardware components, and other parameters.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for extracting data from a scanned image of an array composed of pixels having one or more associated intensity values, the method comprising:
   computing row and column vectors by horizontal and vertical projection of pixel intensity values; 'computing corner-feature-image positions from the row vectors across rows of pixels and column vectors across columns of pixels from the horizontal and vertical pixel-value projections, respectively;
   constructing a feature coordinate system using the computed corner-feature-image positions to index feature images in the scanned image of the array; and
   using the coordinate system to index and extract data from feature images within the scanned image of the array.

2. The method of claim 1, wherein said computing corner-feature-image positions comprises estimating an x-coordinate of left-hand-corner-feature-images from a position of a first peak in the column vector and estimating an x-coordinate of right-hand-corner-feature-images from a position of a last peak in the column vector.

3. The method of claim 1, wherein said computing corner-feature-image positions comprises estimating a y-coordinate of upper corner-feature-images from a position of a first peak in the row vector and estimating a y-coordinate of lower corner-feature-images from a position of a last peak in the row vector.

4. A method for extracting data from a scanned image of an array composed of pixels having one or more associated intensity values, the method comprising:
   indexing images of features within the scanned image of the array by constructing an initial feature coordinate system, wherein said constructing an initial coordinate system comprises computing corner-feature image positions and estimating positions of said features other than the corner features based on the computed corner-feature positions and known inter-feature spacings;
   rotating the feature coordinate system over a range of rotational angles in order to precisely align the feature coordinate system with feature images within the scanned image of the array; and
   using the coordinate system to index and extract data from feature images within the scanned image of the array.

5. The method of claim 4, wherein said corner-feature-image positions are calculated based on horizontal and vertical pixel-value projections of said features.

6. A method for extracting data from a scanned image of an array composed of pixels having one or more associated intensity values, the method comprising:
   indexing images of features within the scanned image of the array by constructing an initial feature coordinate system and rotating the feature coordinate system over a range of rotational angles in order to precisely align the feature coordinate system with feature images within the scanned image of the array;
   extracting data from indexed feature images in order to identify strong features with relatively large signal-to-noise ratios;
   precisely determining the coordinates of the images of the identified strong features;
   using a linear regression technique to refine the feature coordinate system based on the precisely determined coordinates of the images of the identified strong features; and
   using the refined feature coordinate system to index and extract data from feature images within the scanned image of the array.

7. The method of claim 6, wherein said rotating the feature coordinate system over a range of rotational angles in order to precisely align the feature coordinate system with feature images within the scanned image of the array comprises application of rotation matrices.

8. A method for extracting data from a scanned image of an array composed of pixels having one or more associated intensity values, the method comprising:
   indexing images of features within the scanned image of the array by constructing and refining a feature coordinate system using blob analysis;
   for each indexed feature image, selecting a set of pixels within the feature image from which to compute one or more feature intensity signals; and
   extracting data from the selected set of pixels for each feature image within the scanned image of the array.

9. The method of claim 8, wherein said refining a feature coordinate system further comprises linear regression using positions of strong feature indentified by said blob analysis.

10. The method of claim 9, wherein said blob analysis comprises calculation of centroids of blobs representing said features, and modifying locations of said features in said feature coordinate system base on said centroids of said blobs.

11. The method of claim 8, wherein said set of pixels comprises a subset of all features contained with the feature image, wherein a total number of features contained in said subset is less than a total number of features contained within the feature image.

12. A method for extracting data from a scanned image of an array composed of pixels having one or more associated intensity values, the method comprising:
   indexing images of features within the scanned image of the array by constructing and refining a feature coordinate system;
   for each indexed feature image, selecting a set of pixels within the feature image from which to compute one or more feature intensity signals; and
   extracting two or more background-subtracted and normalized feature signal intensities from the selected set of pixels for each feature image within the scanned image of the array.

* * * * *